US012676642B2

(12) United States Patent
Kang et al.

(10) Patent No.: US 12,676,642 B2
(45) Date of Patent: Jul. 7, 2026

(54) DEVICE AND METHOD FOR PERFORMING COMMUNICATION IN LICENSED BAND AND UNLICENSED BAND

(71) Applicant: THINKWARE CORPORATION, Seongnam-si (KR)

(72) Inventors: Jeoungkyu Kang, Seongnam-si (KR); Daewon Kim, Seongnam-si (KR); Taekyu Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 654 days.

(21) Appl. No.: 17/894,423

(22) Filed: Aug. 24, 2022

(65) Prior Publication Data

US 2023/0077201 A1     Mar. 9, 2023

(30) Foreign Application Priority Data

Aug. 25, 2021     (KR) ........................ 10-2021-0112690

(51) Int. Cl.
| | |
|---|---|
| *H04W 84/12* | (2009.01) |
| *H04B 1/52* | (2015.01) |
| *H04L 27/26* | (2006.01) |
| *H04W 4/40* | (2018.01) |

(52) U.S. Cl.
CPC ........... *H04B 1/52* (2013.01); *H04L 27/2602* (2013.01); *H04W 4/40* (2018.02)

(58) Field of Classification Search
CPC ......... H04W 84/12; H04W 4/40; H04W 4/70; H04W 52/52; H04W 4/46; H04W 4/44; H04W 74/02
See application file for complete search history.

(56) References Cited

U.S. PATENT DOCUMENTS

| | | | | |
|---|---|---|---|---|
| 2020/0205140 A1* | 6/2020 | Du | ........................ | H04L 5/0053 |
| 2021/0288709 A1* | 9/2021 | Berger | ................. | H04B 7/0671 |
| 2022/0240196 A1* | 7/2022 | Zhang | ................... | H04W 52/10 |
| 2022/0240207 A1* | 7/2022 | Balasubramanian | ........................ H04W 24/10 |
| 2022/0271980 A1* | 8/2022 | Lim | .................. | H04L 27/26132 |

* cited by examiner

*Primary Examiner* — Tu X Nguyen
(74) *Attorney, Agent, or Firm* — WHDA, LLP

(57) ABSTRACT

A UE includes an antenna for receiving a first reception signal for wireless LAN communication and a second reception signal for sidelink communication; a radio frequency (RF) front-end for processing the first reception signal and the second reception signal; a first transceiver for the wireless LAN communication, a second transceiver for the sidelink communication, and a processor operably coupled to the first transceiver and the second transceiver, the first reception signal is provided from a second UE to the RF front-end through the antenna, the second reception signal is provided from a third UE to the RF front-end through the antenna, the first reception signal provided to the RF front-end is provided to the first transceiver through a first electrical path, and the second reception signal provided to the RF front-end is provided to the second transceiver through a second electrical path.

17 Claims, 21 Drawing Sheets

700

1200

1204

1212

1201

1202

1203

| PROCESSOR | FIRST TRANSCEIVER | RFFE | ANTENNA TUNING UNIT |

SECOND TRANSCEIVER

1222

DEVICE AND METHOD FOR PERFORMING COMMUNICATION IN LICENSED BAND AND UNLICENSED BAND

CROSS-REFERENCE TO RELATED APPLICATIONS

This application is based on and claims priority under 35 U.S.C. § 119 to Korean Patent Application No. 10-2021-0112690, filed on Aug. 25, 2021, in the Korean Intellectual Property Office, the disclosure of which is incorporated by reference herein in its entirety.

BACKGROUND

Technical Field

The following descriptions relate to a device and a method for performing communication in a licensed band and an unlicensed band.

Description of Related Art

After the first generation mobile communication, in which only voice signals are transmitted and received in the past, mobile communication has evolved to the present fifth generation (hereinafter referred to as 5G) mobile communication. The 5G mobile communication technology has been developed with the goal of enhanced mobile broadband (eMBB), ultra-reliable & low latency communication (URLLC), and machine-type communications (mMTC).

Currently, development for system network improvement is in progress based on advanced small cell, cloud radio access network (RAN), ultra-dense network, device-to-device (D2D) communication, wireless backhaul, mobile network, cooperative communication, coordinated multi-point (CoMP) transmission and reception, interference mitigation and cancellation, and the like.

5G mobile communication technology is a new radio access technology (RAT) and is called NR (new radio). NR may support vehicle to everything (V2X) communication (i.e., C(Cellular)-V2X communication).

V2X is a communication technology that exchanges information between pedestrians, objects, and vehicles through wired/wireless communication. V2X may be divided into various types. Specifically, V2X may be divided into types of vehicle to vehicle (V2V), vehicle to infrastructure (V2I), vehicle to network (V2N), and vehicle to pedestrian (V2P). V2V refers to communication between a vehicle and a vehicle, V2I refers to communication between a vehicle and an infrastructure, V2N refers to communication between a vehicle and a network, and V2P refers to communication between a vehicle and a pedestrian.

SUMMARY

A spectrum for C-V2X communication (i.e., licensed band) and an unlicensed band are set separately, and most of the signal exchange during C-V2X communication take place in the licensed band, but an error in communication and a sharp drop in reliability may occur due to an external obstacle or the like. C-V2X communication is basically communication between a vehicle and an object, and reliability and low latency of a signal may be essentially required.

In addition, a user equipment may perform communication in an interval in which both C-V2X communication and wireless LAN communication may be performed. In this case, the user equipment may include a radio frequency (RF) circuit for C-V2X communication and an RF circuit for wireless LAN communication. Accordingly, a method for configuring the RF circuit for C-V2X communication and the RF circuit for wireless LAN communication may be required.

The technical problems to be achieved in this document are not limited to those described above, and other technical problems not mentioned herein will be clearly understood by those having ordinary knowledge in the art to which the present disclosure belongs, from the following description.

According to various embodiments, a first user equipment (UE) may comprise an antenna for receiving a first reception signal for wireless LAN communication and a second reception signal for sidelink communication; a radio frequency (RF) front-end for processing the first reception signal and the second reception signal; a first transceiver for the wireless LAN communication; a second transceiver for the sidelink communication; and a processor operably coupled to the first transceiver and the second transceiver, wherein the first reception signal may be provided from a second UE to the RF front-end through the antenna, wherein the second reception signal may be provided from a third UE to the RF front-end through the antenna, wherein the first reception signal provided to the RF front-end may be provided to the first transceiver through a first electrical path, wherein the second reception signal provided to the RF front-end may be provided to the second transceiver through a second electrical path, wherein the first reception signal provided to the first transceiver may be converted into a third reception signal on baseband, wherein the second reception signal provided to the second transceiver may be converted into a fourth reception signal on the baseband, wherein the third reception signal may be provided from the first transceiver to the processor, and wherein the fourth reception signal may be provided from the second transceiver to the processor.

According to various embodiments, a first user equipment (UE) may comprise a processor for generating a first transmission signal for wireless LAN communication and a second transmission signal for sidelink communication; a first transceiver for the wireless LAN communication operably coupled to the processor, a second transceiver for the sidelink communication operably coupled to the processor, a radio frequency (RF) front-end for processing a third transmission signal and a fourth transmission signal; and an antenna for transmitting the third transmission signal and the fourth transmission signal, wherein the first transmission signal on the baseband may be converted into the third transmission signal configured in a format for the wireless LAN communication through the first transceiver, wherein the second transmission signal on the baseband may be converted into the fourth transmission signal configured in a format for the sidelink communication through the second transceiver, wherein the third transmission signal may be provided from the first transceiver to the RF front-end through a first electrical path, wherein the fourth transmission signal may be provided from the second transceiver to the RF front-end through a second electrical path, wherein the third transmission signal and the fourth transmission signal may be provided to the antenna through the RF front end, and wherein the third transmission signal and the fourth transmission signal may be transmitted to the second UE through the antenna.

The effects that can be obtained from the present disclosure are not limited to those described above, and any other effects not mentioned herein will be clearly understood by those having ordinary knowledge in the art to which the present disclosure belongs, from the following description.

DETAILED DESCRIPTION

Figure 1:
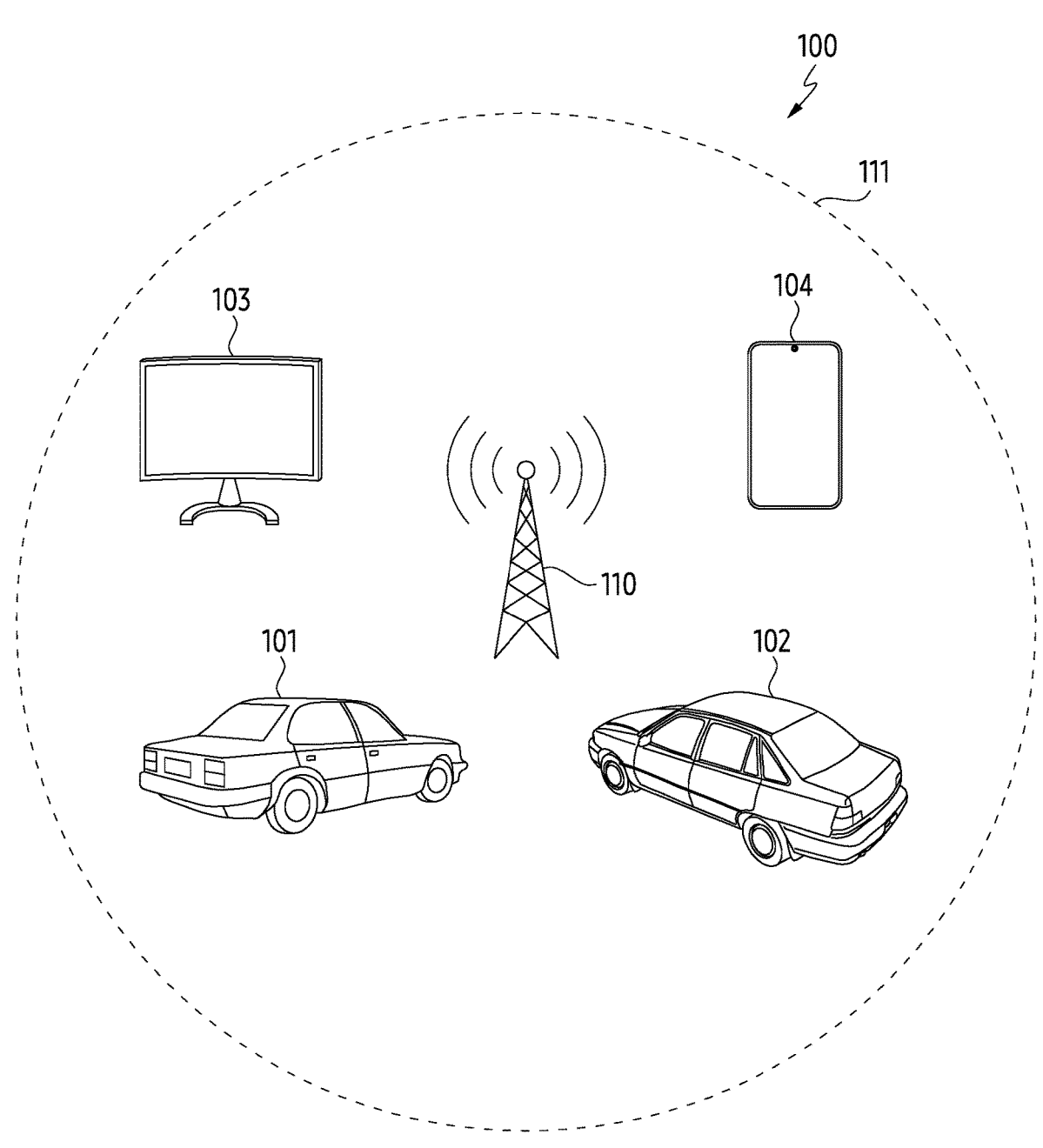
FIG. 1 illustrates a basic conceptual diagram of mobile communication.

According to various embodiments, the same RF front-end can be used to receive a first reception signal related to wireless LAN communication and a second reception signal related to sidelink communication.

The first reception signal related to wireless LAN communication and the second reception signal can be transmitted to one RF front-end through one antenna. The first reception signal and the second reception signal may be transmitted to one of a first transceiver for wireless LAN communication and a second transceiver for sidelink communication through a filter included in one RF front end.

Hereinafter, various embodiments of the present document will be described with reference to the accompanying drawings.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include anyone of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or portion thereof, adapted to perform one or more functions. For example, according to an embodiment, the module may be implemented in a form of an application-specific integrated circuit (ASIC).

FIG. 1 illustrates a basic conceptual diagram of mobile communication.

Referring to FIG. 1, a mobile communication system 100 may include a network for performing communication by an electronic device. The network may be configured in various ways. For example, the network may be configured as NR, long term evolution (LTE), LTE-advanced (LTE-A), or wireless LAN (e.g., Wi-Fi 802.11a/b/g/n/a/ax/be).

The electronic device may include vehicles 101 and 102, a TV 103, and a smartphone 104. The electronic device (e.g., the vehicle 101, the vehicle 102, the TV 103, and the smartphone 104) illustrated in FIG. 1 are exemplary, and the electronic device may include various devices. For example, the electronic device may include a home appliance, a server, an Internet of Thing (JOT) device, a computer, a laptop, and the like. The electronic device may include a mobile equipment (ME) that integrates a universal subscriber identity module (USIM), a universal integrated circuit card (UICC), or an embedded UICC (eUICC).

The electronic device may be variously referred to according to the type of the network. The electronic device may be referred to as user equipment (hereinafter, UE), a mobile station, a subscriber station, a wireless terminal (or device), or the like.

The electronic device may be connected to the base station 110. The base station 110 may include various devices or nodes for wireless communication. For example, the base station 110 may include a transmit point (TP), transmit-receive point (TRP), enhanced base station (or eNB), a 5G base station (gNB), an access point (AP), and the like.

A coverage 111 may indicate a limit area in which a signal may be transmitted and received through the base station 110. The coverage 111 illustrated in FIG. 1 is illustrated in a circular shape, but is not limited thereto. The coverage 111 may be configured in various forms according to various situations. In addition, the coverage 111 does not mean only a two-dimensional area, but may be configured to a three-dimensional space (e.g., a hemisphere or a sphere).

The electronic device may transmit and receive a control message and user data through legacy communication and/or 5G communication. For example, the control message may include a message related to at least one of security control, bearer setup, authentication, registration, or mobility management of the electronic device. For example, the user data may mean user data excluding a control message transmitted and received between an electronic device and a core network (e.g., an Evolved Packet Core (EPC)).

The electronic device may perform communication through the base station 110, and the electronic devices may be directly connected to each other without passing through the base station.

For example, the vehicle 101 and the vehicle 102 may be directly connected to each other without passing through the base station 110. As an example, the vehicle 101 and the vehicle 102 may transmit and receive data through sidelink communication.

As another example, the TV 103 and the smartphone 104 may transmit and receive data to and from each other through various wireless communication (e.g., Bluetooth or Wi-Fi) without passing through the base station 110.

The mobile communication system 100 of FIG. 1 illustrates an example configured with one base station 110, but is not limited thereto. The mobile communication system 100 may include a plurality of base stations including the base station 110. Each of the plurality of base stations may be connected to a plurality of electronic devices, and the electronic devices connected to different base stations may communicate with each other.

According to an embodiment, the first electronic device connected to the first base station among a plurality of base stations may go out of the coverage of the first base station. The first electronic device may go out of the coverage of the first base station and enter the coverage of the second base station among the plurality of base stations. The first electronic device may perform a handover procedure for releasing a connection with a first base station and establishing a connection with a second base station. After the handover procedure is completed, the first electronic device may perform communication through the second base station.

Hereinafter, for convenience of description, the base station may be described as a base station (BS). In addition, the electronic device connected to the base station may be described as a user equipment (UE).

Figure 2:
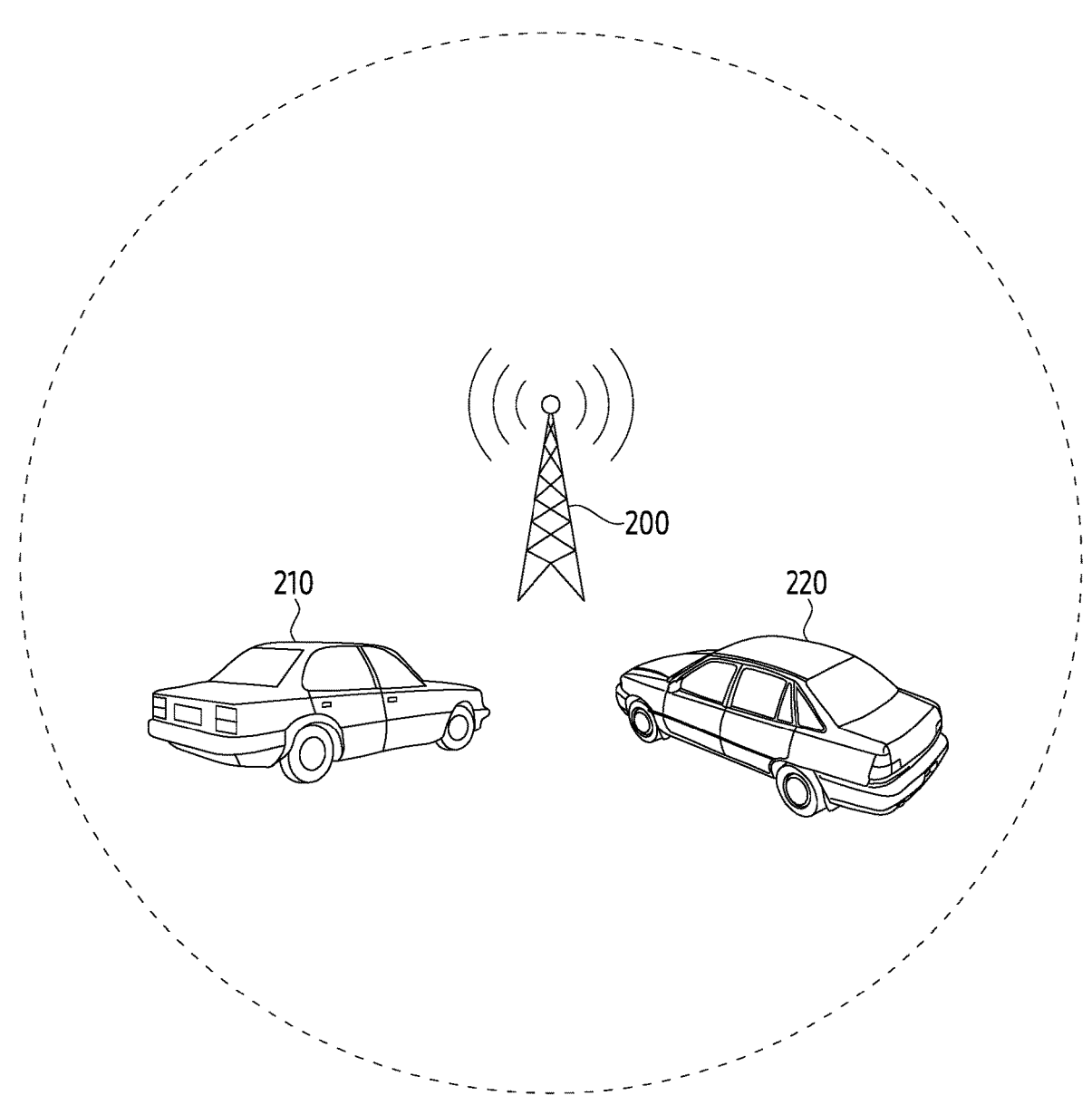
FIG. 2 is a diagram for describing an example of sidelink communication in NR.

FIG. 2 is a diagram for describing an example of sidelink communication in NR.

Referring to FIG. 2, the UE 1 210 and the UE 2 220 may directly perform sidelink communication without passing through the BS 200. The UE 1 210 and the UE 2 220 may be in a state connected to the BS 200. In other words, the UE 1 210 and the UE 2 220 may be located within the coverage of the BS 200.

According to an embodiment, the UE 1 210 and the UE 2 220 may receive information on a resource (or information on resource scheduling) to perform the sidelink communication from the BS 200. The UE 1 210 and the UE 2 220 may identify a resource to perform sidelink communication based on information on a resource to perform sidelink communication received from the BS 200. The UE 1 210 and the UE 2 220 may perform sidelink communication through the identified resource.

Specifically, the BS 200 may include information on a plurality of resources in a downlink control information (DCI) through a physical downlink control channel (PDCCH) and transmit the information. A detailed description of the DCI will be described later.

Figure 3:
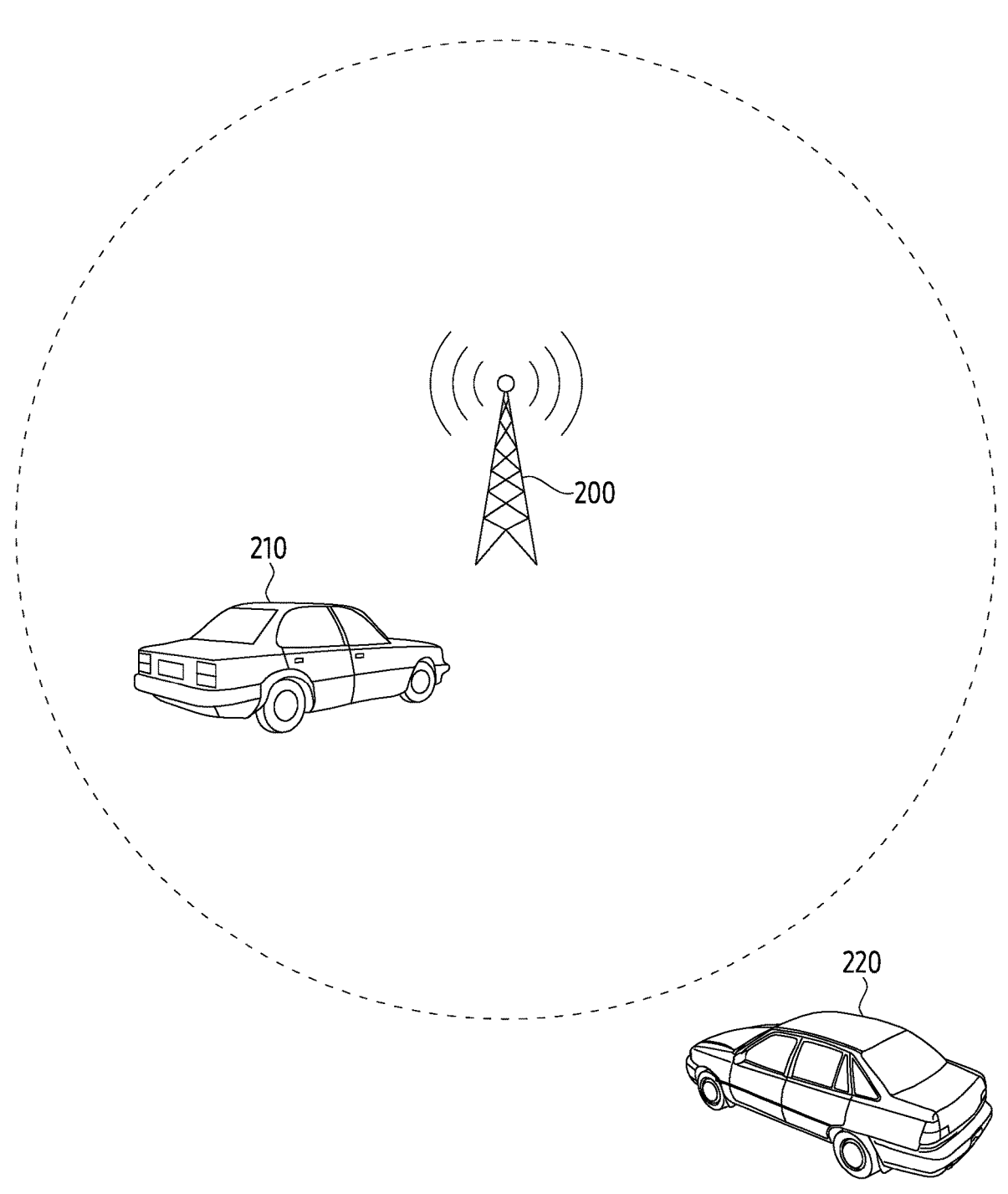
FIG. 3 is a diagram for describing another example of sidelink communication in NR.

FIG. 3 is a diagram for describing another example of sidelink communication in NR.

Referring to FIG. 3, unlike FIG. 2, only the UE 1 210 may be connected to the BS 200, and the UE 2 220 may not be connected to the BS 200.

According to an embodiment, only the UE 1 210 of the UE 1 210 and the UE 2 220 may receive information (or information on a resource pool) on a plurality of resources from the BS 200. The UE 1 210 may select a resource unit from among a plurality of resources and transmit a signal to the UE 2 220 through the selected resource. In addition, the UE 2 220 may identify a resource selected by the UE 1 210 and perform sidelink communication through the resource selected by the UE 1.

In FIG. 3, an embodiment of receiving information on a plurality of resources through the BS 200 when only the UE 1 210 is connected to the BS 200 and the UE 2 220 is not connected to the BS 200 has been described, but the above embodiment may be applied to the situation of FIG. 2.

Specifically, the UE 1 210 may perform sidelink communication by transmitting the SCI (sidelink control information) to the UE 2 220 through the PSCCH (physical sidelink shared channel) and transmitting data to the UE 2 220 through the PSSCH (physical sidelink shared channel) based on the SCI. A detailed description of the SCI will be described later.

Hereinafter, the DCI and the SCI may be described.

First, an example of a DCI format may be described. The DCI format may be configured as illustrated in Table 1 below.

TABLE 1

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause 9.3.1 of [10, TS 38.473] |
| 2_6 | Notifying the power saving information outside DRX Active Time for one or more UEs |
| 3_0 | Scheduling of NR sidelink in one cell |
| 3_1 | Scheduling of LTE sidelink in one cell |

Referring to Table 1, the DCI format may include a DCI format 0, a DCI format 1, and a DCI format 2.

The DCI format 0 may include a DCI format 0_0, a DCI format 0_1 and a DCI format 0_2. The DCI format 0 may be used in uplinks.

The DCI format 0_0 may be used for scheduling the PUSCH in one cell (or uplink (UL) cell). The DCI format 0_1 may be used for scheduling one or more PUSCHs in one cell. The DCI format 0_1 may be used to indicate downlink feedback information (DFI) for configured grant PUSCH. The DCI format 0_0 and the DCI format 0_1 may be used for eMBB.

The DCI format 0_2 may be used for scheduling the PUSCH in one cell. The DCI format 0_2 may be used for URLLC.

Meanwhile, in the unlicensed band (or sharing spectrum), the DCI format 0 may include information different from the above-described information.

For example, the DCI formats 0_0 and 0_1 may include an indicator indicating a channel access type.

For example, in the unlicensed band, the DCI format 0_1 may include an indicator indicating whether it is downlink feedback indication (DFI) or uplink grant.

The DCI format 1 may include a DCI format 1_0, a DCI format 1_1 and a DCI format 1_2. The DCI format 1 may be used in downlink.

The DCI format 1_0 may be used for scheduling a PDSCH in one cell (or a downlink (DL) cell). The DCI format 1_1 may be used for scheduling the PDSCH in one cell. DCI format 1_1 may be used to trigger one shot HARQ (hybrid automatic repeat and request)-ACK (acknowledgement) codebook feedback. The DCI format 1_0 and the DCI format 1_1 may be used for eMBB.

The DCI format 1_2 may be used for scheduling the PDSCH in one cell. The DCI format 1_2 may be used for URLLC.

Meanwhile, in an unlicensed band (or sharing spectrum), the DCI format 1 may include information different from the above-described information. For example, the DCI formats 1_0 and 1_1 may include an indicator indicating a channel access type.

The DCI format 2 may include a DCI format 2_0, a DCI format 2_1, a DCI format 2_2, a DCI format 2_3, a DCI format 2_4, a DCI format 2_5, and a DCI format 2_6. The DCI format 2 may be used for special purposes.

The DCI format 2_0 may be used to inform a slot format, a channel occupancy time (COT) duration, a possible resource block (RB) sets, and a search space set group switching.

For example, the DCI format 2_0 may include a slot format indicator. The slot format indicator may indicate whether a symbol is DL, UL, or flexible in the corresponding slot.

Meanwhile, in the unlicensed band, the DCI format 2_0 may be used in the same format. However, information indicated by the DCI format 2_0 may be changed. For example, through DCI format 2_0, in which band the channel is occupied may be indicated for each resource. In other words, the DCI format 2_0 may include information indicating whether a corresponding channel is empty.

The DCI format 2_1 may be used to inform a physical resource block (PRB)(s) and OFDM symbol(s) that the UE assume will not transmit under its own intention. In other words, the DCI format 2_1 may include information for indicating not to listen to a signal in a corresponding slot.

The DCI format 2_2 may be used to transmit a transmit power control (TPC) command for PUCCH and PUSCH. In other words, the DCI format 2_2 may be used for uplink power control.

The DCI format 2_3 may be used to transmit a group of TPC commands for sounding reference signal (SRS) transmission by one or more UEs. In other words, the DCI format 2_3 may be used for uplink power control.

The DCI format 2_4 may be used to inform the PRB(s) and OFDM symbol(s) that cancel uplink transmission. In other words, the DCI format 2_4 may include an uplink cancellation indicator.

The DCI format 2_5 may be used to inform availability of soft resource. In other words, the DCI format 2_5 may include an indicator for IAB node support.

The DCI format 2_6 may be used to inform power saving information outside a DRX (Discontinuous Reception) activation time (DRX active time) for one or more UEs. In other words, the DCI format 2_6 may include a DRX activation indicator.

The DCI format 3 may include a DCI format 3_0 and a DCI format 3_1.

The DCI format 3_0 may be used for NR sidelinks in one cell.

The DCI format 3_1 may be used for a long-term evolution (LTE) sidelink in one cell.

Hereinafter, an example of an SCI format may be described.

The above-described DCI refers to control information transmitted by the BS to the UE through the PDCCH, but the SCI may refer to control information that the UE transmits to another UE through the PSCCH. The SCI may be transmitted in two steps, and a detailed operation related thereof may be described below.

The first UE may transmit the first SCI (e.g., 1st-stage SCI) to the second UE through the PSCCH. The first SCI may include information for scheduling the PSSCH. Thereafter, the first UE may transmit the second SCI.

The second SCI may be transmitted to the second UE through the PSSCH. The second UE may identify information for scheduling the PSSCH and decode the second SCI based on the first SCI. For example, the second SCI may be piggybacked together with data through the PSSCH and transmitted to the second UE.

Meanwhile, the first SCI transmitted through the PSCCH may be used to schedule the second SCI and the PSSCH. The first SCI may include SCI format 1-A.

Meanwhile, the second SCI transmitted through the PSSCH may be used to transmit sidelink scheduling information. The second SCI may include a SCI format 2-A and/or a SCI format 2-B. The SCI format 2-A and the SCI format 2-B may be used to decode the PSSCH.

Hereinafter, a frequency band used in NR may be described.

A frequency band (or frequency range) used in NR may be divided into a first type and a second type. The first type of frequency band may be referred to as FR (Frequency Range) 1.

The second type of frequency band may be referred to as FR 2.

For example, the ranges of the first type frequency band and the second type frequency band may be configured as illustrated in Table 2.

TABLE 2

| Frequency Range designation | Corresponding frequency range | Subcarrier Spacing (SCS) |
|---|---|---|
| FR 1 | 450 MHz-6000 MHz | 15, 30, 60 kHz |
| FR 2 | 24250 MHz-52600 MHz | 60, 120, 240 kHz |

Referring to Table 2, the FR 1 may be configured in a band of 450 MHz to 6000 MHz. The FR 2 may be configured in a band of 24250 MHz to 52600 MHz. The specific frequency values described in Table 2 are exemplary and may be changed.

Figure 4:
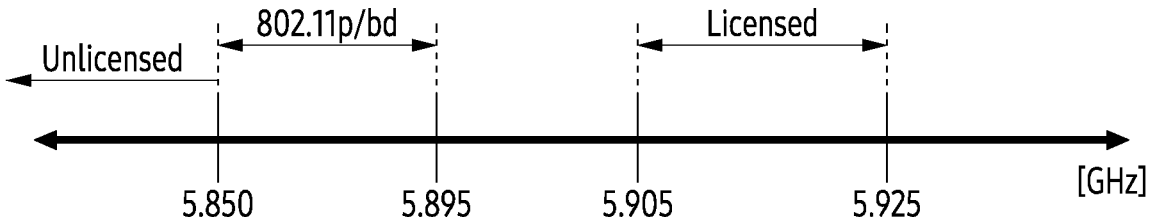
FIG. 4 illustrates a band plan of 5.9 GHz.

FIG. 4 illustrates a band of 5.9 GHz.

Referring to FIG. 4, the 5.9 GHz band may include an unlicensed band and a licensed band. The specific frequency range illustrated in FIG. 4 may be set differently for each country and may be changed.

For example, 20 MHz, from 5.905 GHz to 5.925 GHz, may be set as the licensed band and may be be used for V2X communication (or C-V2X communication). In addition to the licensed band of 20 MHz, 10 MHz from 5.895 GHz to 5.905 GHz may also be set as the licensed band.

For example, 45 MHz from 5.850 GHz to 5.895 GHz may be used for wireless Internet (e.g., 802.11p/bd).

A band equal to or less than 5.850 GHz or greater than 5.925 GHz may be set as the unlicensed band. The unlicensed band may be used for a various purposes, and for example, it may be used for communication for a vehicle (e.g., self-driving). The unlicensed band may be referred to as a sharing spectrum.

In the following description, an example in which the first user equipment and the second user equipment operate a licensed band and an unlicensed band to transmit and receive data through sidelink communication will be described according to another embodiment.

For example, when performing sidelink communication, the first user equipment and the second user equipment may transmit and receive low-capacity data below the threshold through the licensed band, and large-capacity data above the threshold may be transmitted and received through the unlicensed band.

For example, when performing sidelink communication, the first user equipment and the second user equipment may transmit and receive data having high reliability through the licensed band, and may transmit and receive data having somewhat low reliability through the unlicensed band. In this case, the data having high reliability may include personal information on the user equipment user, login information, financial information, payment information, and the like.

For example, when performing sidelink communication, the first user equipment and the second user equipment may transmit and receive data requiring encryption through the licensed band, and may transmit and receive data not requiring encryption through the unlicensed band. In this case, the data requiring encryption may include personal information on the user equipment user, login information, financial information, payment information, and the like.

For example, when performing sidelink communication, the first user equipment and the second user equipment may transmit and receive data requiring urgency through the licensed band, and may transmit and receive data not requiring urgency through the unlicensed band. In this case, the data requiring urgency may include disaster information, emergency information, accident information, emergency braking information, and the like.

For example, when performing sidelink communication, the first user equipment and the second user equipment may transmit and receive data related to the software update notification of the vehicle through the licensed band, and may transmit and receive data for software update of the vehicle through the unlicensed band.

For example, when performing sidelink communication, the first user equipment and the second user equipment may transmit and receive data that attribute is mandatory through the licensed band, and transmit and receive data that attribute is optional through the unlicensed band.

For example, when performing sidelink communication, the first user equipment and the second user equipment may transmit and receive upload data through the licensed band, and may transmit and receive download data through the unlicensed band.

For example, when performing sidelink communication, the first user equipment and the second user equipment may transmit and receive a resource indicator indicating a resource for communication through a licensed band, and may transmit and receive data through resources included in the unlicensed band. Specifically, the first user equipment and the second user equipment may transmit and receive data through the resource of the unlicensed band indicated by the resource indicator transmitted and received through the licensed band.

For example, equipment when performing sidelink communication, the first user equipment and the second user equipment may transmit and receive control information for the first user equipment to control the second user through the license band, may transmit and receive ACK/NACK information or feedback information on the control information through the unlicensed band.

An example in which the above-described the first user equipment and the second user equipment operate the licensed band and the unlicensed band through sidelink communication is only an embodiment, and as the opposite case to the above-described example, the licensed band and the unlicensed band may be operated.

According to an embodiment, the unlicensed band may be used for sidelink communication. In addition, the unlicensed band may be used for wireless LAN communication. In other words, the sidelink communication (e.g., C-V2X communication) and wireless LAN communication may coexist in the unlicensed band. Hereinafter, for convenience of description, the sidelink communication may be described as C-V2X communication, which is an example of the sidelink communication. The C-V2X communication may be performed based on cellular communication (e.g., LTE communication or NR communication).

A user equipment may include both a module for wireless LAN communication and a module for C-V2X communication. Accordingly, the user equipment may perform C-V2X communication and wireless LAN communication in the same band (i.e., unlicensed band). For example, the user equipment may include an RF circuit for performing both C-V2X communication and wireless LAN communication.

In the following specification, an embodiment for performing C-V2X communication and wireless LAN communication in the same band (i.e., unlicensed band) by the user equipment may be described. First, FIG. 5 to FIG. 7 may describe C-V2X communication and wireless LAN communication.

Figure 5:
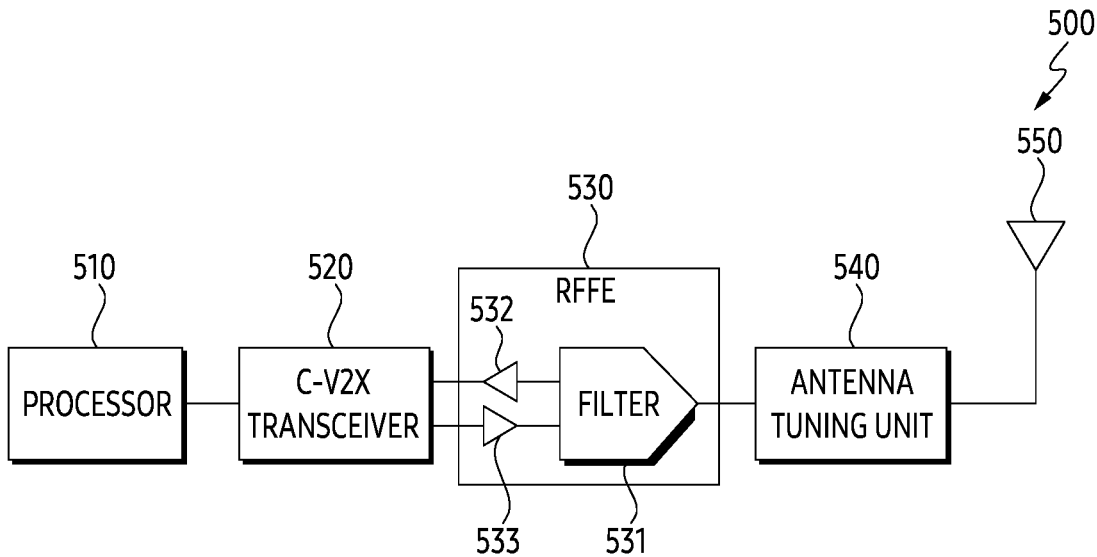
FIG. 5 illustrates an example of a user equipment for C-V2X communication.

FIG. 5 illustrates an example of a user equipment for C-V2X communication.

Referring to FIG. 5, the user equipment 500 may include a processor 510, a C-V2X transceiver 520, a RFFE 530, an antenna tuning unit 540, and an antenna 550.

For example, the antenna 550 may receive a signal and/or power from the outside or transmit the signal and/or power to the outside. For example, the antenna 550 may include a radiator composed of a conductor (or a conductive pattern). The radiator may be formed on a substrate (e.g., a printed circuit board (PCB). The antenna 550 may be used to receive a signal related to C-V2X communication.

For example, the antenna tuning unit 540 may include a manual device inserted between the RFFE 530 and the antenna 550. The antenna tuning unit 540 may be used to adjust the impedance related to the antenna 550.

For example, the RFFE 530 may include a filter 531, a reception signal amplifier 532, and a transmission signal amplifier 533. For example, the filter 531 may filter a signal based on a frequency band of a signal used for C-V2X communication. The filter 531 may be represented by various names. For example, the filter 531 may be referred to as a frequency filter.

The reception signal amplifier 532 may be used to amplify the reception signal through the antenna 550. In other words, the reception signal may be amplified after passing through the reception signal amplifier 532. The transmission signal amplifier 533 may be used to amplify the transmission signal. In other words, the transmission signal may be amplified after passing through the transmission signal amplifier 533.

For example, the C-V2X transceiver 520 may include a radio frequency integrated circuit (RFIC). The C-V2X transceiver 520 may be operated by the processor 510. The C-V2X transceiver 520 may include a digital to analog converter (DAC), an analog to digital converter (ADC), a mixer, and/or an oscillator.

For example, the C-V2X transceiver 520 may obtain a signal provided (or received) through the antenna 550, the antenna tuning unit 540, and the RFFE 530. For example, the provided signal may be preprocessed through the RFFE 530. The C-V2X transceiver 520 may convert the preprocessed signal into a baseband signal. The C-V2X transceiver 520 may provide the converted signal to the processor 510.

As another example, the C-V2X transceiver 520 may receive the baseband signal from the processor 510. The C-V2X transceiver 520 may convert the baseband signal into a signal for C-V2X communication.

The above-described C-V2X transceiver 520 may be variously named. The C-V2X transceiver 520 may be referred to as a cellular communication transceiver, a sidelink communication transceiver, or the like. In addition, the C-V2X transceiver 520 may support not only C-V2X communication but also all of sidelink communication and cellular communication.

Figure 6:
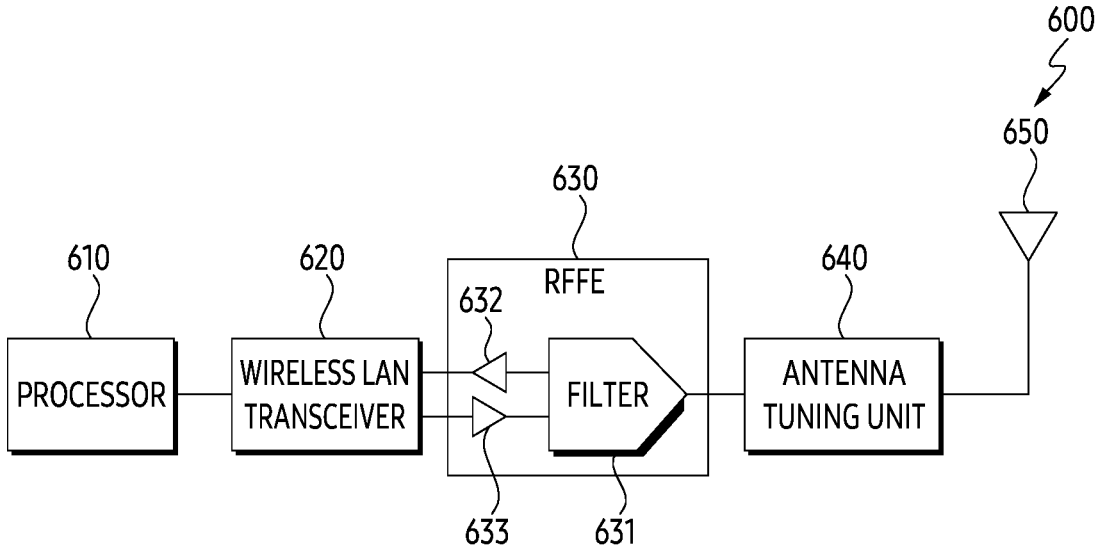
FIG. 6 illustrates an example of a user equipment for wireless LAN communication.

FIG. 6 illustrates an example of a user equipment for wireless LAN communication.

Referring to FIG. 6, the user equipment 600 may include a processor 610, a wireless LAN transceiver 620, a RFFE 630, an antenna tuning unit 640, and an antenna 650. For example, the user equipment 600 may operate similarly to the user equipment 600 of FIG. 5. However, the user equipment 600 is not used for C-V2X communication, but may be used for wireless LAN communication.

For example, the antenna 650 may be used to receive a signal related to wireless LAN communication. For example, the RFFE 630 may include a filter 631, a reception signal amplifier 632 and a transmission signal amplifier 633. For example, the filter 631 may filter a signal based on a frequency band of a signal used for wireless LAN communication. For example, the wireless LAN transceiver 620 may convert the baseband signal into a signal for wireless LAN communication. The WLAN transceiver 620 may include a digital to analog coveter (DAC), an analog to digital converter (ADC), a mixer, and/or an oscillator.

Figure 7:
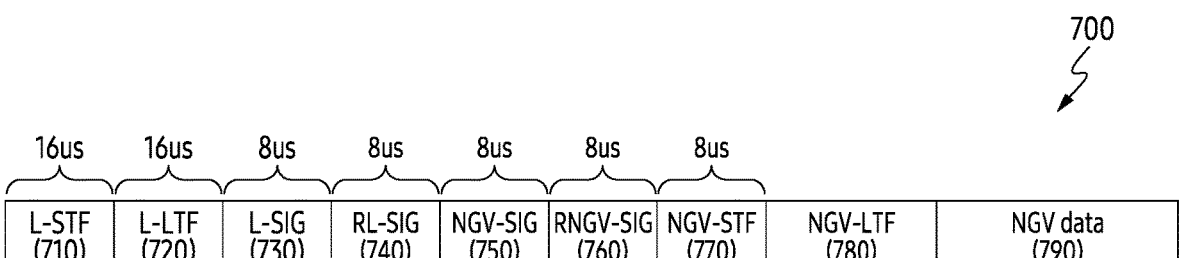
FIG. 7 illustrates an example of an NGV PPDU used in wireless LAN communication.

FIG. 7 illustrates an example of an NGV PPDU used in wireless LAN communication.

Referring to FIG. 7, the NGV PPDU 700 may be a physical protocol data unit (PPDU) based on an 802.11bd standard (or a next generation V2X (NGV) standard). The NGV PPDU 700 may be an example of a signal transmitted and received by the user equipment 600 illustrated in FIG. 6.

The NGV PPDU 700 may include L-STF 710, L-LTF 720, L-SIG 730, RL-SIG 740, NGV-SIG 750, RNGV-SIG 760, NGV-STF 770, NGV-LTF 780, and NGV data 790.

For example, the L-STF 710, the L-LTF 720, and the L-SIG 730 may be included for backward compatibility.

For example, the RL-SIG 740 may include the same information as the L-SIG 730. In addition, the RL-SIG 740 may be converted in the same manner as the L-SIG 730. For example, the RL-SIG 740 may be converted based on a binary phase shift keying (BPSK).

For example, the NGV-SIG 750 may include various information on communication of the NGV standard. For example, the NGV-SIG 750 may include at least one of information on a bandwidth, information on a midamble period, and information on an LTF format. For example, the RNGV-SIG 760 may include the same information as the NGV-SIG 750. In addition, the RNGV-SIG 760 may be converted in the same manner as the NGV-SIG 750.

For example, the NGV-STF 770 may be a short training field (STF) related to the NGV standard. The NGV-STF 770 may be configured as a first sequence according to the NGV standard.

For example, the NGV-LTF 780 may be a long training field (LTF) related to the NGV standard. The NGV-LTF 780 may be configured as a second sequence according to the NGV standard.

For example, the NGV data 790 may include a service field, PHY pad bits, and/or a PSDU. Although not illustrated, the NGV PPDU 700 may further include at least one midamble positioned between the NGV data 790. At least one midamble may be used to perform additional channel estimation.

For example, the bandwidth of the NGV PPDU 700 may be set to one of 10 MHz and 20 MHz.

According to an embodiment, the user equipment may include all of an RF circuit (or module) for wireless LAN communication and an RF circuit (or module) for C-V2X communication. For example, the user equipment may include an RF circuit for performing both C-V2X communication and wireless LAN communication. The configuration of the user equipment for the above embodiment may be described below.

Figure 8:
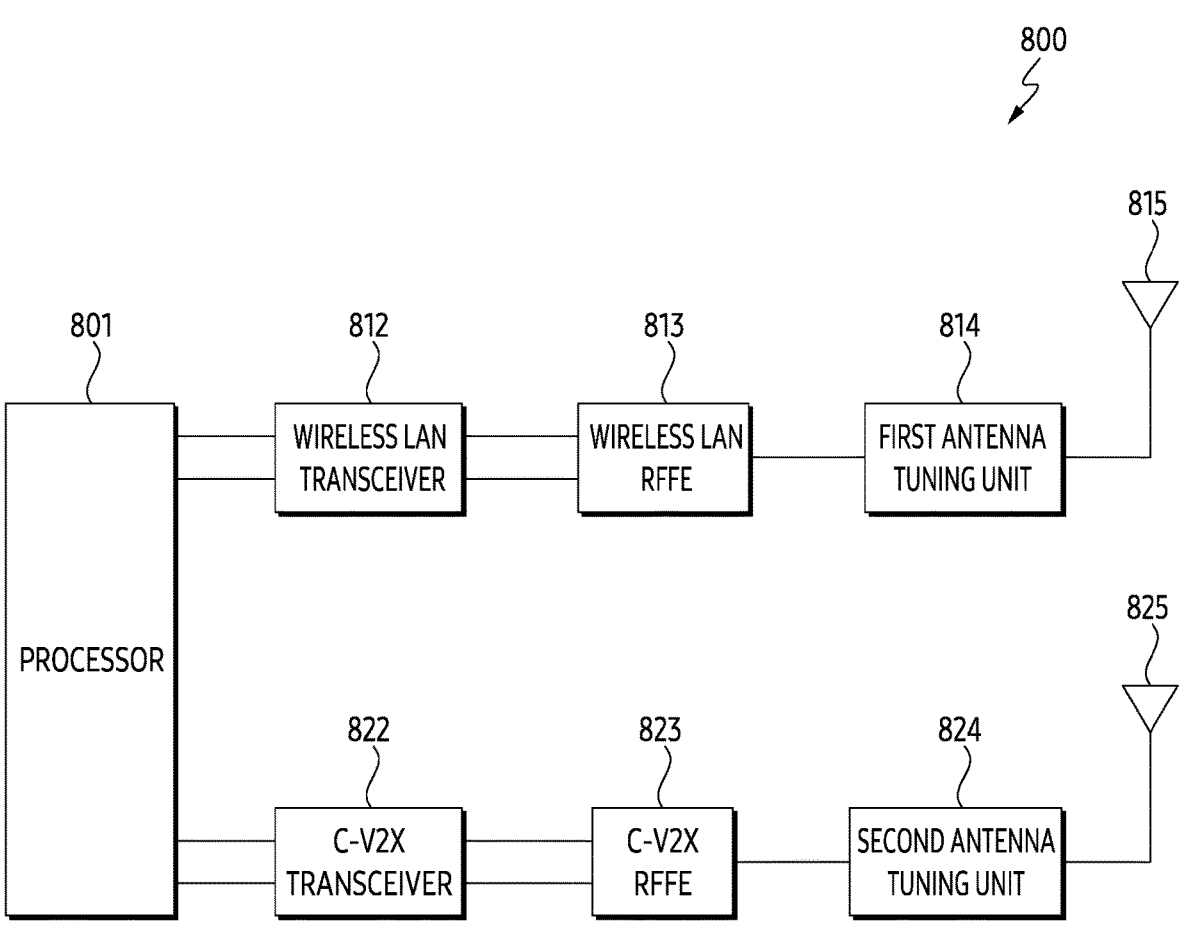
FIG. 8 illustrates an example of a user equipment for C-V2X communication and wireless LAN communication.

FIG. 8 illustrates an example of a user equipment for C-V2X communication and wireless LAN communication.

Referring to FIG. 8, the user equipment 800 may include all of an RF circuit for a wireless LAN and an RF circuit for a C-V2X. In the user equipment 800, the RF circuit for the wireless LAN and the RF circuit for the C-V2X may be configured in parallel.

For example, the RF circuit for the wireless LAN may include a wireless LAN transceiver 812, a wireless LAN RFFE 813, a first antenna tuning unit 814, and a first antenna 815. The wireless LAN transceiver 812, the wireless LAN RFFE 813, the first antenna tuning unit 814 and the first antenna 815 may be related to the wireless LAN transceiver 620 illustrated in FIG. 6, the RFFE 630, the antenna tuning unit 640, and the antenna 650.

For example, the RF circuit for the C-V2X may include a C-V2X transceiver 822, a C-V2X RFFE 823, a second antenna tuning unit 824, and a second antenna 825. The C-V2X transceiver 822, the C-V2X RFFE 823, the second antenna tuning unit 824 and the second antenna 825 may be related to the C-V2X transceiver 520 illustrated in FIG. 5, the RFFE 530, the antenna tuning unit 540, and the antenna 550.

For example, the processor 801 may be connected to the wireless LAN transceiver 812 and the C-V2X transceiver 822. The processor 801 may receive a wireless LAN signal from the wireless LAN transceiver 812, and may transmit the wireless LAN signal through the wireless LAN transceiver 812. In addition, the processor 801 may receive a C-V2X signal from the C-V2X transceiver 822 and transmit the C-V2X signal through the C-V2X transceiver 822.

According to an embodiment, unlike FIG. 8, when the C-V2X band is shared with the unlicensed band, the user equipment may transmit and receive the wireless LAN signal and the C-V2X signal through one RFFE. A detailed embodiment of this may be described below.

Figure 9:
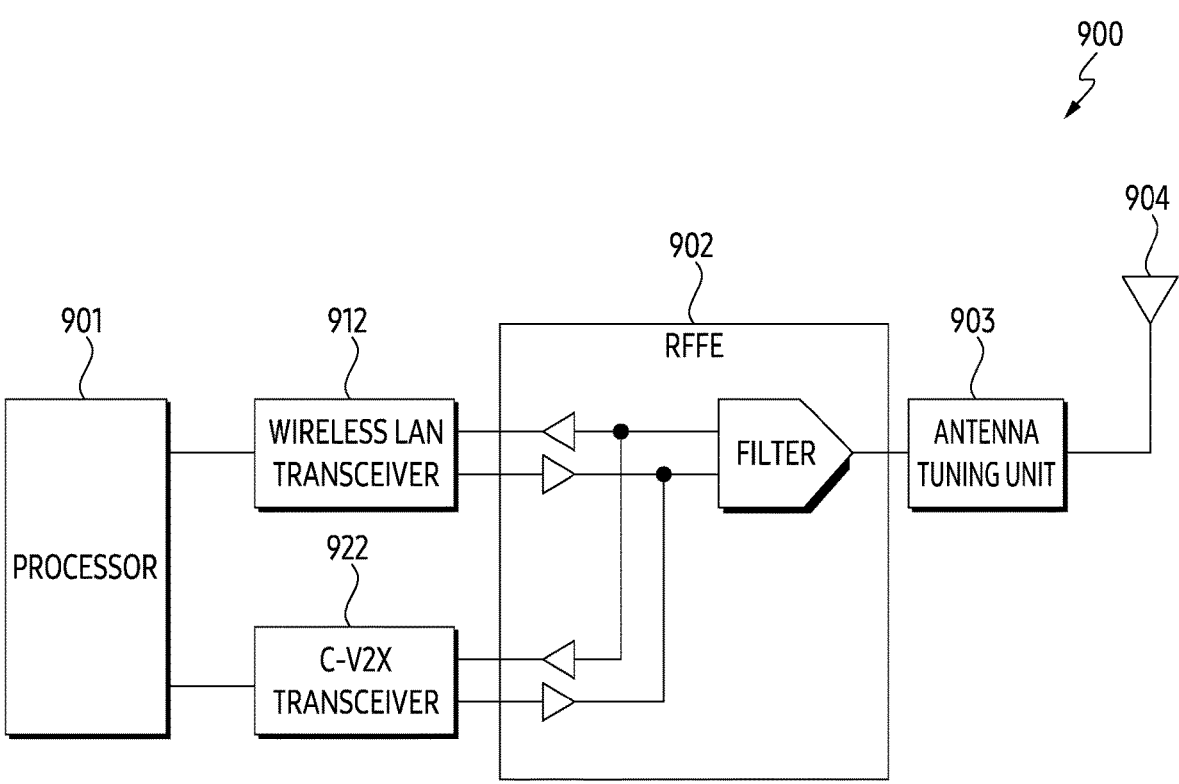
FIG. 9 illustrates an example of a user equipment for C-V2X communication and wireless LAN communication.

FIG. 9 illustrates an example of a user equipment for C-V2X communication and wireless LAN communication.

Referring to FIG. 9, the user equipment 900 may include a processor 901, a wireless LAN transceiver 912, a C-V2X transceiver 922, a RFFE 902, an antenna tuning unit 903, and an antenna 904.

For example, the antenna 904 and the antenna tuning unit 903 may be used to transmit and receive both a wireless LAN signal and a C-V2X signal. In other words, the wireless LAN signal and the C-V2X signal may be moved to the RFFE 902 through the antenna 904 and the antenna tuning unit 903.

For example, the RFFE 902 may distinguish between the wireless LAN signal and the C-V2X signal through a filter. A signal that has passed through the filter of the RFFE 902 may be classified and moved to one of the wireless LAN transceiver 912 and the C-V2X transceiver 922.

For example, the wireless LAN transceiver 912 may receive the wireless LAN signal, convert the received wireless LAN signal, and then provide (or transmit) the wireless LAN signal to the processor 901. In addition, the C-V2X transceiver 922 may receive the C-V2X signal, convert the C-V2X signal, and then provide (or transmit) the C-V2X signal to the processor 901.

Accordingly, the RF structure for the C-V2X and the RF structure for the wireless LAN are not separately configured, but may be configured as one. The user equipment 900 may receive the wireless LAN signal and the C-V2X signal transmitted and received in the same band through one RF structure (i.e., the antenna 904, the antenna tuning unit 903, and the RFFE 902).

Figure 10:
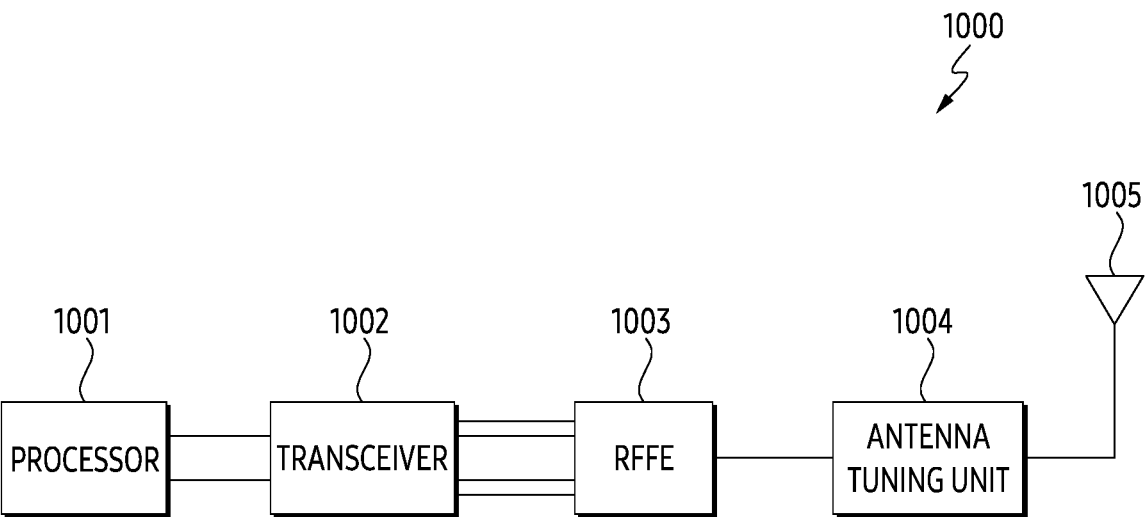
FIG. 10 illustrates an example of a user equipment for C-V2X communication and wireless LAN communication.

FIG. 10 illustrates an example of a user equipment for C-V2X communication and wireless LAN communication.

Referring to FIG. 10, the user equipment 1000 may include a processor 1001, a transceiver 1002, a RFFE 1003, an antenna tuning unit 1004, and an antenna 1005. Unlike the user equipment 900 illustrated in FIG. 9, one transceiver 1002 may be configured in the user equipment 1000. The transceiver 1002 may process the wireless LAN signal and the C-V2X signal, and may provide the processed signal to the processor 1001. In addition, the transceiver 1002 may distinguish and process the WLAN signal and the C-V2X signal, and may provide the processor 1001 with an indicator of which signal is provided to the processor 1001.

Figure 11:
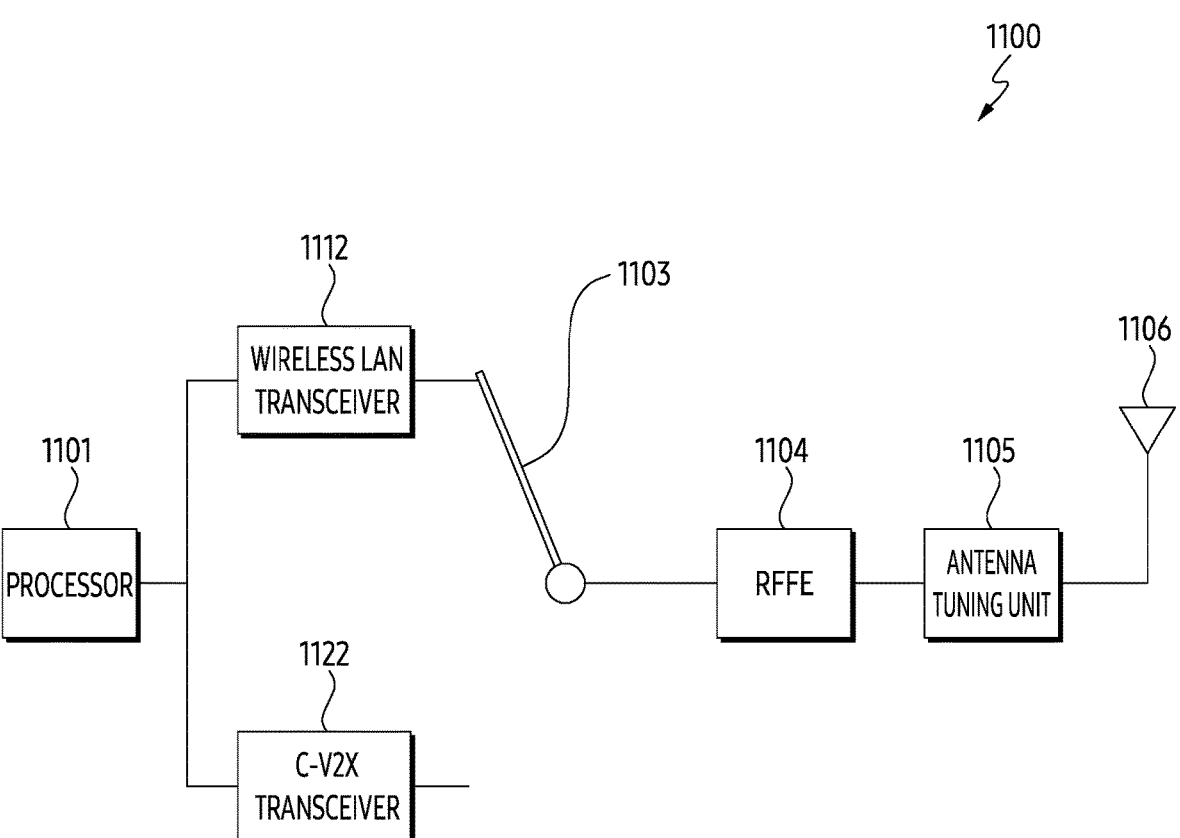
FIG. 11 illustrates an example of a user equipment for C-V2X communication and wireless LAN communication.

FIG. 11 illustrates an example of a user equipment for C-V2X communication and wireless LAN communication.

Referring to FIG. 11, the user equipment 1100 may include a processor 1101, a wireless LAN transceiver 1112, a C-V2X transceiver 1122, a switch 1103, an RFFE 1104, an antenna tuning unit 1105, and an antenna 1106.

The user equipment 1100 (e.g., the processor 1101) may control the switch 1103. The user equipment 1100 may transmit and receive the V2X signal or transmit and receive the wireless LAN signal by controlling the switch 1103.

For example, when performing wireless LAN communication, the user equipment 1100 may set the switch 1103 to be connected to the wireless LAN transceiver 1112. As another example, when performing C-V2X communication, the user equipment 1100 may set the switch 1103 to be connected to the C-V2X transceiver 1122.

According to an embodiment, the switch 1103 may be changed to various forms.

For example, the switch 1103 may be used only to control the connection of wireless LAN communication. Basically, the user equipment 1100 may perform C-V2X communication. During C-V2X communication, when wireless LAN connection is required, the user equipment 1100 may activate the wireless LAN communication function through the switch 1103. For example, when the wireless LAN signal strength is greater than the signal strength of the C-V2X communication, the processor 1101 may output a switching control signal to the switch 1103 to activate a path for wireless LAN communication.

As another example, the switch 1103 may be used only to control the connection of the C-V2X communication. Basically, the user equipment 1100 may perform wireless LAN communication. During wireless LAN communication, when C-V2X connection is required, the user equipment 1100 may activate the C-V2X communication function through the switch 1103. For example, when the C-V2X signal strength is greater than the wireless LAN signal strength, the processor 1101 may output a switching control signal to the switch 1103 to activate a path for C-V2X communication.

Figure 12:
FIG. 12 illustrates an example of a user equipment for C-V2X communication and wireless LAN communication.
Figure 12:
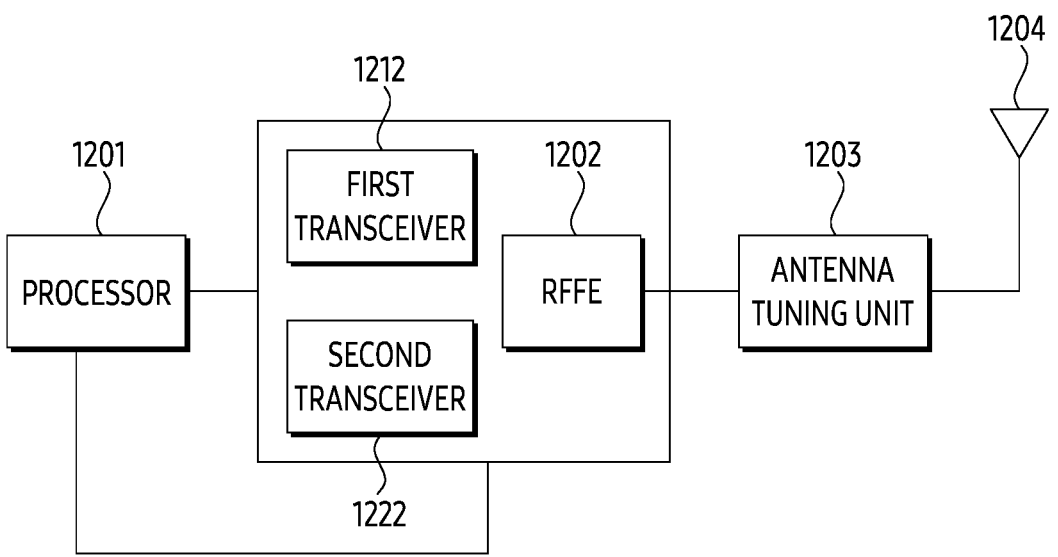

FIG. 12 illustrates an example of a user equipment for C-V2X communication and wireless LAN communication.

Referring to FIG. 12, the user equipment 1200 may include a processor 1201, a first transceiver 1212, a second transceiver 1222, an RFFE 1202, an antenna tuning unit 1203, and an antenna 1204.

The antenna 1204 may be used to receive a first reception signal related to wireless LAN communication and a second reception signal related to sidelink communication. For example, the first reception signal and the second reception signal may be received through the antenna 1204 in the unlicensed band. The antenna tuning unit 1203 may be used to adjust the impedance of the antenna 1204. For example, the antenna 1204 and the antenna tuning unit 1203 may be used to receive both the first reception signal related to wireless LAN communication and the second reception signal related to sidelink communication. In other words, the first reception signal and the second reception signal may be moved to the RFFE 1202 through the antenna 1204 and the antenna tuning unit 1203.

The RFFE 1202 may be used to process the first reception signal and the second reception signal. The first transceiver 1212 may be used for wireless LAN communication. The second transceiver 1222 may be used for sidelink communication. The processor 1201 may be functionally connected to at least one of the first transceiver 1212, the second transceiver 1222, and the RFFE 1202. The processor 1201 may be functionally connected to at least one of the first transceiver 1212, the second transceiver 1222, and the RFFE 1202.

The first reception signal may be provided from the second user equipment to the RFFE 1202 through the antenna 1204. The second reception signal may be provided from the third user equipment to the RFFE 1202 through the antenna 1204.

The first reception signal provided to the RFFE 1202 may be provided to the first transceiver 1212 through a first electrical path. The second reception signal provided to the RFFE 1202 may be provided to the second transceiver 1222 through a second electrical path.

The first reception signal provided to the first transceiver 1212 may be converted into a third reception signal on the base band. The second reception signal provided to the second transceiver 1222 may be converted into a fourth reception signal on the base band. The third reception signal may be provided from the first transceiver 1212 to the processor 1201. The fourth reception signal may be provided from the second transceiver 1222 to the processor 1201. Accordingly, the processor 1201 may decode the first reception signal and the second reception signal.

Although not illustrated, the RFFE 1202 may include a frequency filter and a signal amplifier. The frequency filter may be used to provide a first reception signal and a second reception signal as one of a first electrical path and a second electrical path. In other words, a path in which the first reception signal and the second reception signal are provided may be divided into one of a first electrical path and a second electrical path through the frequency filter. In addition, the first reception signal may be amplified by the signal amplifier and provided to the first transceiver 1212. The second reception signal may be amplified by the signal amplifier and provided to the second transceiver 1222.

Although not illustrated, the user equipment 1200 may further include a switch controlled by the processor 1201. The processor 1201 may control the first electrical path and the second electrical path through the switch.

The processor 1201 may identify a subcarrier spacing of the received signal. For example, the subcarrier spacing of the first signal related to wireless LAN communication may be set to 156.25 kHz. The subcarrier spacing of the second signal related to the sidelink communication may be set to one of 15 kHz, 30 kHz, 60 kHz, 120 kHz, or 240 kHz. Accordingly, the processor 1201 may control the first electrical path and the second electrical path through the switch based on the subcarrier spacing of the received signal. For example, the processor 1201 may activate one of the first electrical path and the second electrical path based on the subcarrier spacing of the received signal. For example, the processor 1201 may activate the first electrical path by controlling the switch based on receiving a signal having a subcarrier spacing of 156.25 kHz.

The processor 1201 may identify a bandwidth of the received signal. For example, the bandwidth of the first signal related to wireless LAN communication may be set to one of 10 MHz and 20 MHz. The second signal related to the sidelink communication may be set to an unfixed bandwidth. Accordingly, the processor 1201 may activate one of the first electrical path and the second electrical path based on the bandwidth of the received signal. For example, the processor 1201 may activate the first electrical path by controlling the switch based on receiving a signal having a bandwidth of 20 MHz.

Hereinafter, an example of an operation of the first user equipment may be described. For example, the first user equipment may include a structure of FIGS. 8 to 12. For example, the sidelink communication (or cellular communication, V2X communication) and the wireless LAN communication may be performed within the same band. The first user equipment may process both the sidelink signal and the wireless LAN signal through the same RFFE.

Figure 13:
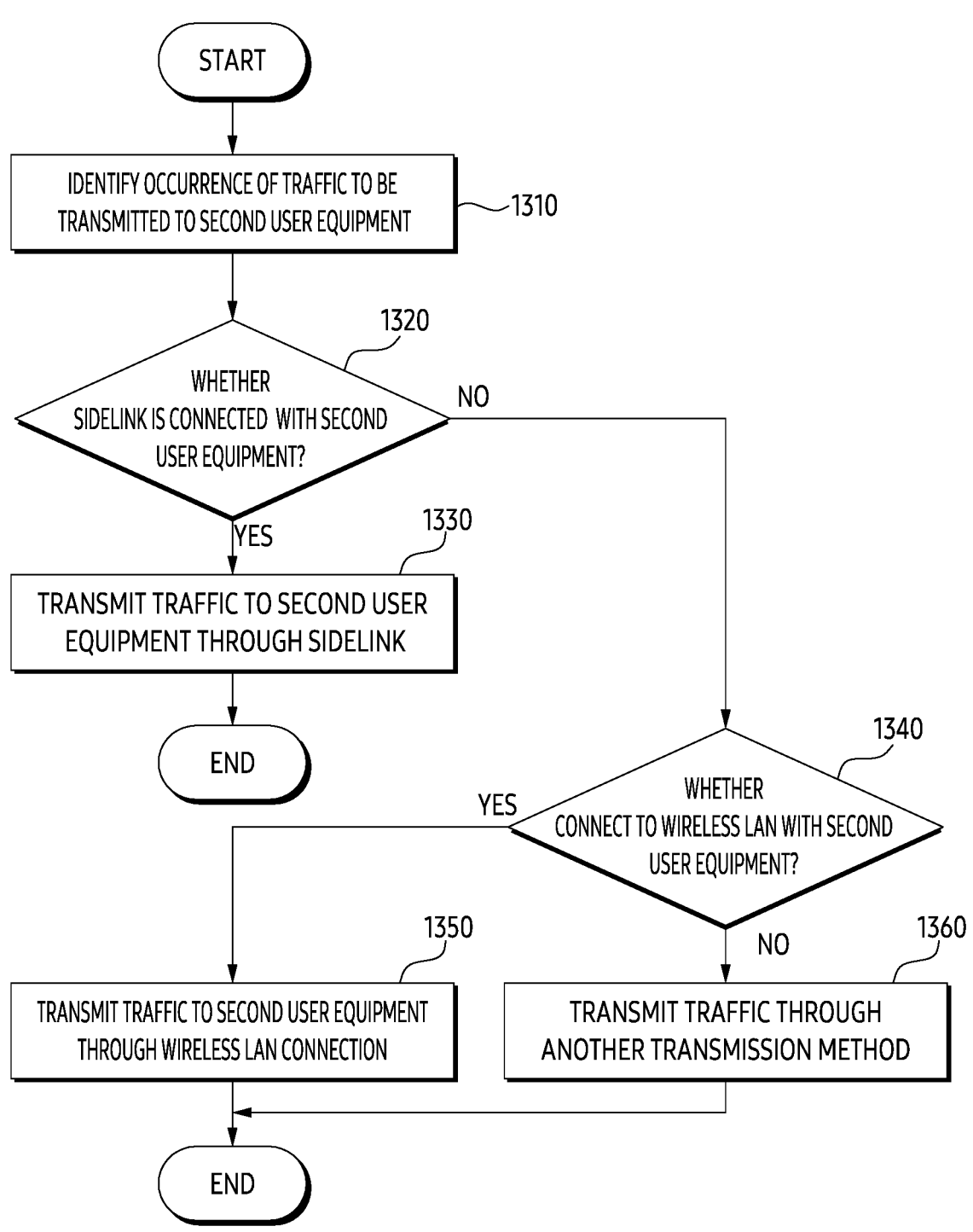
FIG. 13 illustrates an example of an operation of a first user equipment according to various embodiments.

FIG. 13 illustrates an example of an operation of a first user equipment according to various embodiments.

Referring to FIG. 13, in operation 1310, the first user equipment (e.g., a processor of the first user equipment) may identify the occurrence of traffic to be transmitted to the second user equipment (or an external user equipment). The first user equipment may transmit traffic through sidelink communication (e.g., C-V2X communication) or wireless LAN communication with the second user equipment. For example, the first user equipment may process both the sidelink signal and the wireless LAN signal through the same RFFE.

In operation 1320, the first user equipment may determine whether the sidelink is connected with the second user equipment. In order to transmit traffic, the first user equipment may first determine whether the sidelink connection with the second user equipment is established.

In operation 1330, when a sidelink connection with the second user equipment is established, the first user equipment may transmit traffic to the second user equipment through the sidelink. In other words, the first user equipment may transmit traffic to the second user equipment through the sidelink in a state where a sidelink connection with the second user equipment is established. In other words, the first user equipment may transmit traffic to the second user equipment through the sidelink based on the sidelink connection established with the second user equipment.

In operation 1340, when the sidelink connection with the second user equipment is not established, the first user equipment may determine whether to connect to the wireless LAN (e.g., 802.11p/bd) with the second user equipment. In order to transmit traffic, the first user equipment may secondarily determine whether the wireless LAN connection with the second user equipment is established.

In operation 1350, when the wireless LAN connection with the second user equipment is established, the first user equipment may transmit traffic to the second user equipment through the wireless LAN connection. In other words, in a state that the wireless LAN connection with the second user equipment is established, the first user equipment may transmit traffic to the second user equipment through the wireless LAN. In other words, based on the establishment of the wireless LAN connection with the second user equipment, the first user equipment may transmit traffic to the second user equipment through the wireless LAN.

In operation 1360, when a wireless LAN connection with the second user equipment is not established, the first user equipment may transmit traffic through other transmission method.

For example, the first user equipment may transmit traffic through a broadcast. The first user equipment may transmit traffic to the second user equipment in which connection is not established by transmitting the traffic through the broadcast method.

As another example, the first user equipment may transmit traffic to a base station connected to the first user equipment. When the direct connection with the second user equipment is not established, the first user equipment may transmit traffic to the base station to transmit traffic. Thereafter, the traffic may be transmitted to the second user equipment through the base station.

Figure 14:
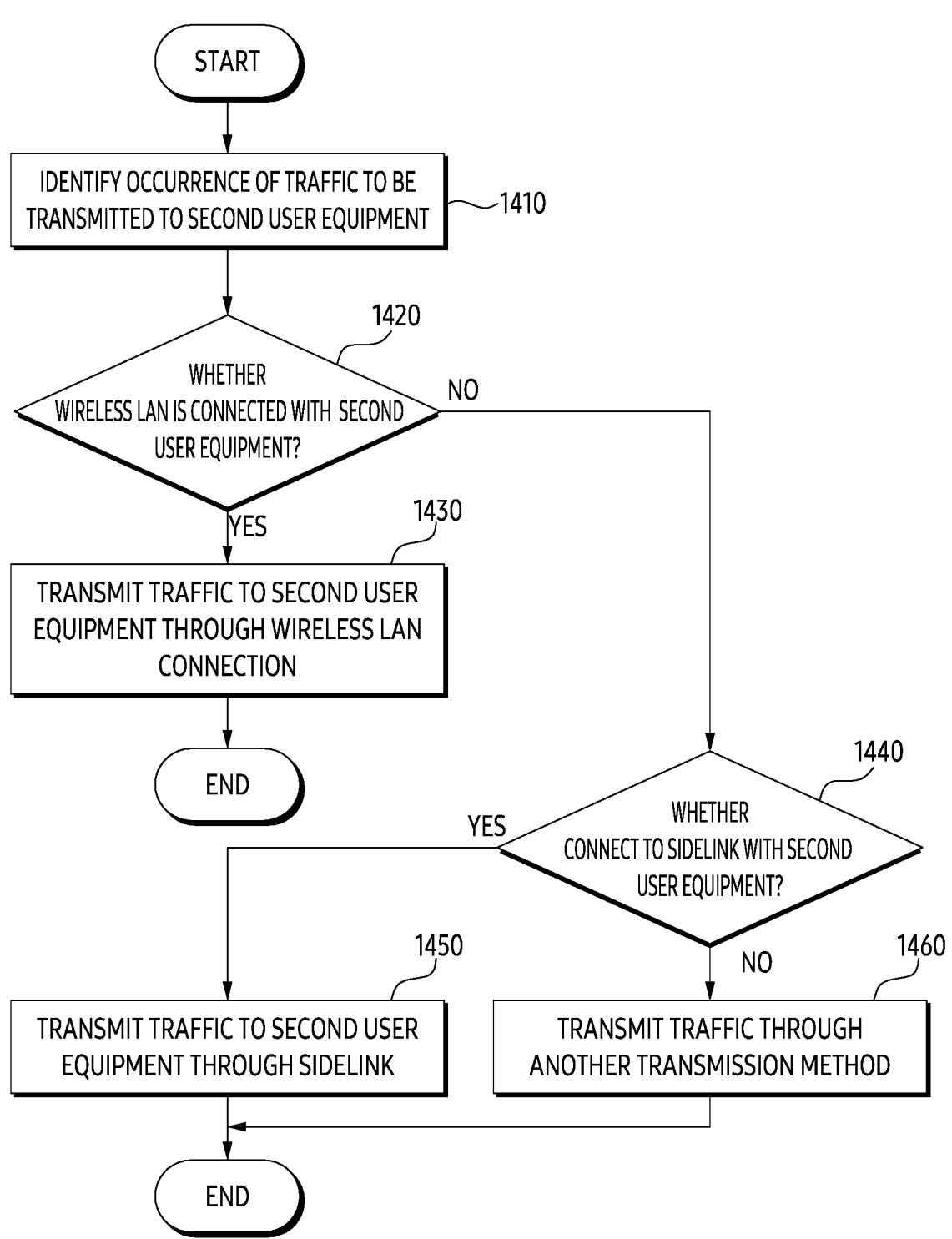
FIG. 14 illustrates another example of an operation of a first user equipment according to various embodiments.

FIG. 14 illustrates another example of an operation of a first user equipment according to various embodiments.

Referring to FIG. 14, in operation 1410, the first user equipment (e.g., a processor of the first user equipment) may identify the occurrence of traffic to be transmitted to the second user equipment (or an external user equipment). Operation 1410 may be related to operation 1310 of FIG. 13.

In operation 1420, the first user equipment may determine whether to connect to the wireless LAN (e.g., 802.11p/bd) with the second user equipment. In order to transmit traffic, the first user equipment may first determine whether the wireless LAN connection with the second user equipment is established.

In operation 1430, when the wireless LAN connection with the second user equipment is established, the first user equipment may transmit traffic to the second user equipment through the wireless LAN connection. In other words, in a state that the wireless LAN connection with the second user equipment is established, the first user equipment may transmit traffic to the second user equipment through the wireless LAN. In other words, based on the establishment of the wireless LAN connection with the second user equipment, the first user equipment may transmit traffic to the second user equipment through the wireless LAN.

In operation 1440, when the wireless LAN connection with the second user equipment is not established, the first user equipment may determine whether the second user equipment is connected to the sidelink. In order to transmit traffic, the first user equipment may secondarily determine whether the wireless LAN connection with the second user equipment is established.

In operation 1450, when the sidelink connection with the second user equipment is established, the first user equipment may transmit traffic to the second user equipment through the sidelink. In other words, in a state that the sidelink connection with the second user equipment is established, the first user equipment may transmit traffic to the second user equipment through the sidelink. In other words, based on the establishment of the sidelink connection with the second user equipment, the first user equipment may transmit traffic to the second user equipment through the sidelink.

In operation 1460, when the sidelink connection with the second user equipment is not established, the first user equipment may transmit traffic through other transmission method.

For example, the first user equipment may transmit traffic through the broadcast. The first user equipment may transmit traffic to the second user equipment in which connection is not established by transmitting the traffic through the broadcast method.

As another example, the first user equipment may transmit traffic to the base station connected to the first user equipment. When the direct connection with the second user equipment is not established, the first user equipment may transmit traffic to the base station to transmit traffic. Thereafter, the traffic may be transmitted to the second user equipment through the base station.

Figure 15:
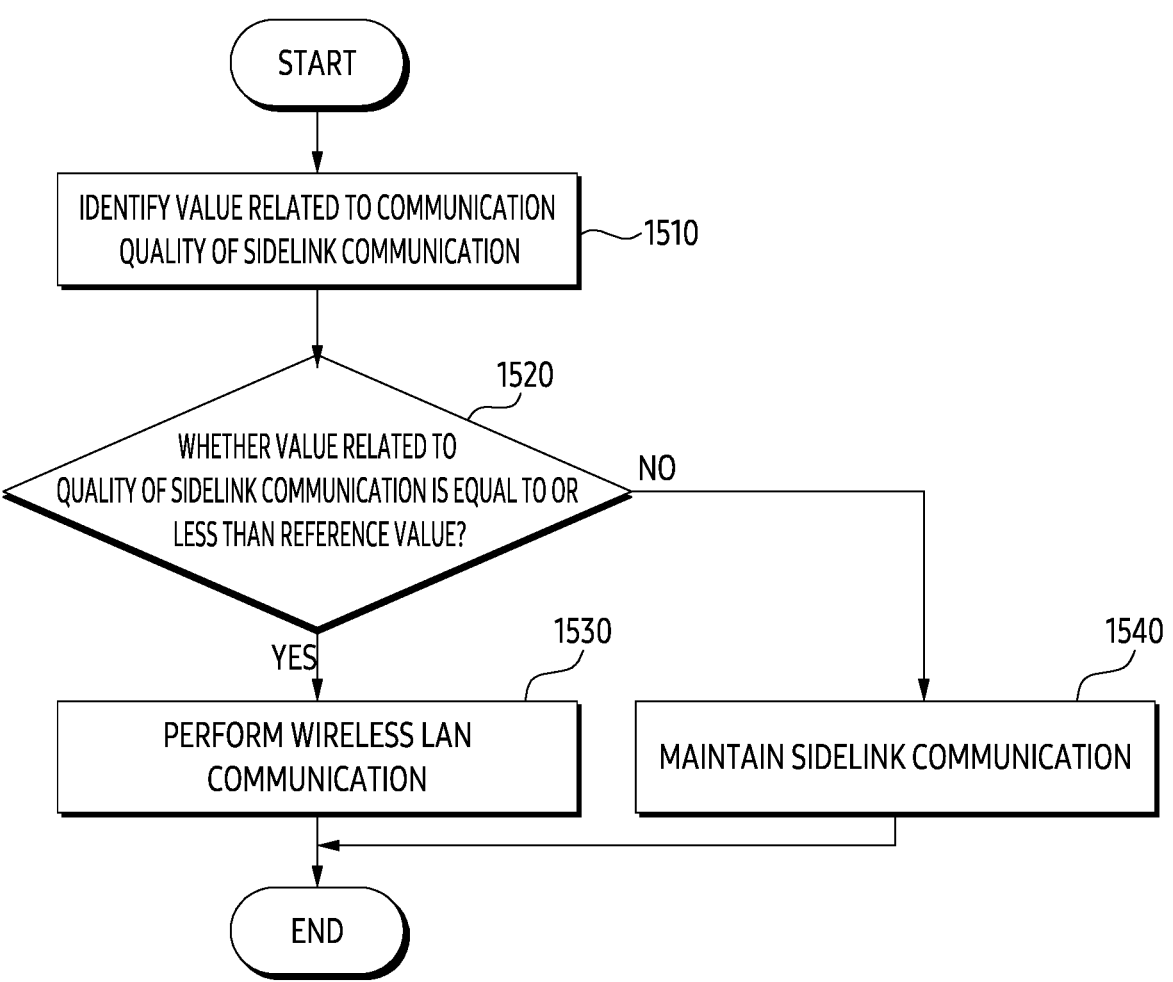
FIG. 15 illustrates another example of an operation of a first user equipment according to various embodiments.

FIG. 15 illustrates another example of an operation of a first user equipment according to various embodiments.

Referring to FIG. 15, in operation 1510, the first user equipment may identify a value related to communication quality of the sidelink communication.

According to an embodiment, the first user equipment (e.g., a processor of the first user equipment) may identify a value related to communication quality during performing sidelink communication. For example, the first user equipment may periodically or aperiodically identify a value related to communication quality.

For example, the first user equipment may perform sidelink communication with the second user equipment. For example, the first user equipment may perform C-V2X communication. Ultra-high reliability and low latency may be required in C-V2X communication. Accordingly, the first user equipment may identify a value related to communication quality for ultra-high reliability and low-latency communication.

The first user equipment may identify the value related to the quality of the sidelink communication. The value related to the quality of the sidelink communication may be variously set. For example, the value related to the quality of the sidelink communication may include at least one of SL-RSSI, SL-RSRP, SL-RSRQ, SINR, or CQI, or a combination thereof.

For example, the first user equipment may identify the SL-RSRQ as the value related to the quality of the sidelink communication. The first user equipment may identify the SL-RSSI and the SL-RSRP. The first user equipment may identify (or calculate) the SL-RSRQ based on the SL-RSSI and the SL-RSRP. In other words, the value related to communication quality of the sidelink communication may be determined based on the SL-RSRQ.

As another example, the first user equipment may identify the product (or sum) of the SL-RSRQ and the SINR as the value related to the quality of the sidelink communication. In other words, the first user equipment may identify the value related to the quality of the sidelink communication by calculating the product (or sum) of the SL-RSRQ and the SINR.

In operation 1520, the first user equipment may determine whether the value related to the quality of the sidelink communication is equal to or less than a reference value. When ultra-high reliability and low latency are required, the first user equipment may determine whether the value related to the quality of the sidelink communication is equal to or less than a reference value in order to determine whether data is properly transmitted or received.

In operation 1530, when the value related to the quality of the sidelink communication is equal to or less than the reference value, the first user equipment may perform wireless LAN communication.

For example, when the sidelink communication and the wireless LAN communication are established, the first user equipment may perform wireless LAN communication based on that the value related to quality of the sidelink communication is less than or equal to the reference value.

For another example, when only the sidelink communication is established, the first user equipment may establish the wireless LAN connection based on that the value related to the quality of the sidelink communication is equal to or less than a reference value. Thereafter, the first user equipment may perform wireless LAN communication.

In operation 1540, the first user equipment may maintain the sidelink communication when the value related to the quality of the sidelink communication is not less than or equal to the reference value. In other words, when the value of the quality of the sidelink communication exceeds the reference value, the first user equipment may maintain the sidelink communication. In other words, the first user equipment may maintain the sidelink communication based on that the value related to the quality of the sidelink communication is equal to or less than the reference value.

According to operations 1510 to 1540, the first user equipment may preliminarily perform communication through a wireless LAN when the quality of the sidelink communication is reduced during performing sidelink communication.

Figure 16:
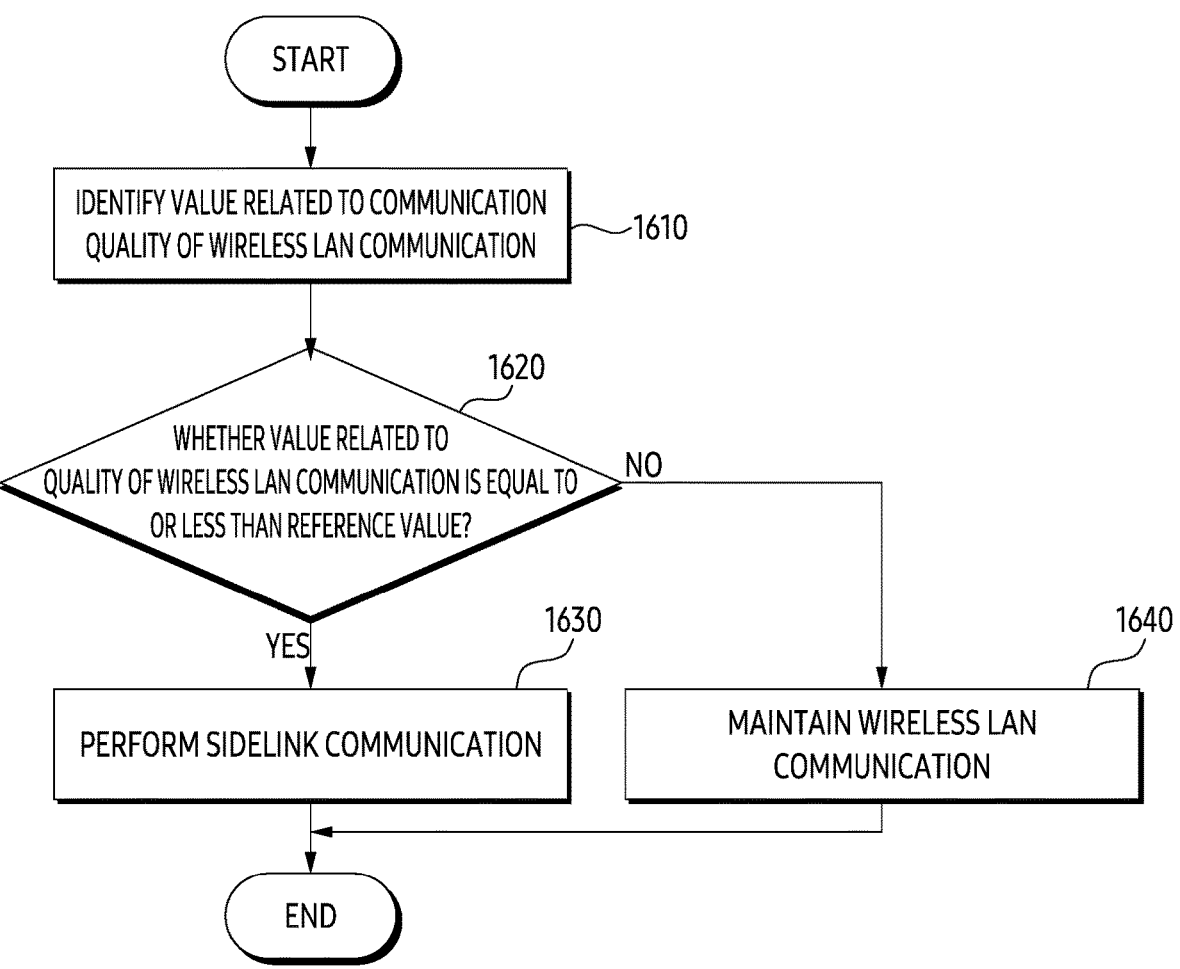
FIG. 16 illustrates another example of an operation of a first user equipment according to various embodiments.

FIG. 16 illustrates another example of an operation of a first user equipment according to various embodiments.

Referring to FIG. 16, in operation 1610, the first user equipment may identify a value related to communication quality of wireless LAN communication.

According to an embodiment, the first user equipment (e.g., a processor of the first user equipment) may identify a value related to communication quality during performing wireless LAN communication. For example, the first user equipment may periodically or aperiodically identify the value related to communication quality.

For example, the first user equipment may perform wireless LAN communication with the second user equipment. For example, the first user equipment may perform V2X communication. Ultra-high reliability and low latency may be required in V2X communication. Accordingly, the first user equipment may identify the value related to communication quality for ultra-high reliability and low-latency communication.

In operation 1620, the first user equipment may determine whether the value related to the quality of the wireless LAN communication is equal to or less than the reference value.

In operation 1630, when the value related to the quality of the sidelink communication is equal to or less than the reference value, the first user equipment may perform sidelink communication.

For example, when the sidelink communication and the wireless LAN communication are established, the first user equipment may perform the sidelink communication based on that the value related to the quality of the wireless LAN communication is less than or equal to the reference value.

For another example, when only the wireless LAN communication is established, the first user equipment may establish the sidelink connection based on that the value related to the quality of the wireless LAN communication is equal to or less than the reference value. Thereafter, the first user equipment may perform sidelink communication.

In operation 1640, when the value of the quality of the wireless LAN communication is not less than or equal to the reference value, the first user equipment may maintain the wireless LAN communication. In other words, the first user equipment may maintain wireless LAN communication when the value related to quality of wireless LAN communication exceeds the reference value. In other words, the first user equipment may maintain wireless LAN communication based on that the value related to quality of wireless LAN communication is equal to or less than the reference value.

According to operations 1610 to 1640, when the quality of the wireless LAN communication is reduced during wireless LAN communication, the first user equipment may preliminarily perform communication through the sidelink.

Figure 17:
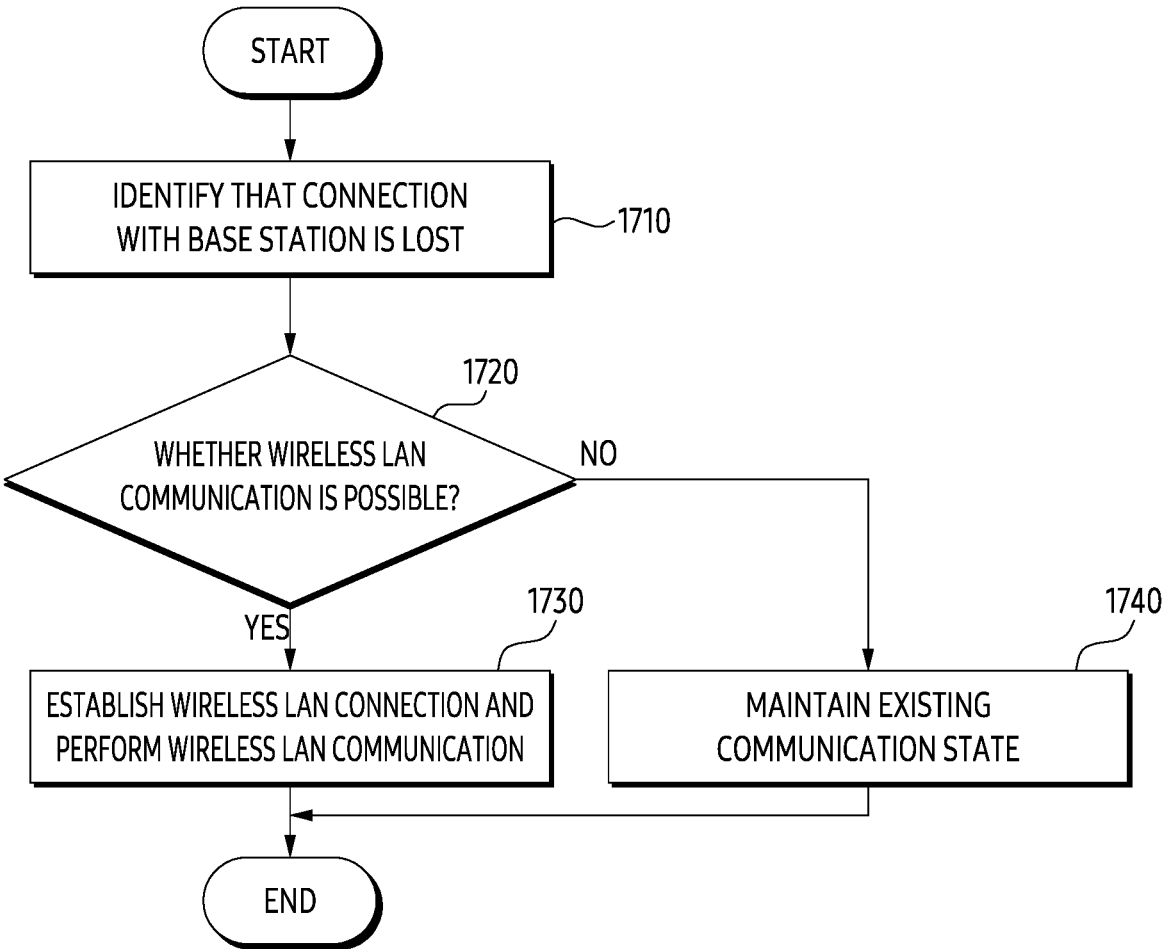
FIG. 17 illustrates another example of an operation of a first user equipment according to various embodiments.

FIG. 17 illustrates another example of an operation of a first user equipment according to various embodiments.

Referring to FIG. 17, in operation 1710, the first user equipment (e.g., a processor of the first user equipment) may identify that the connection with the base station is lost.

For example, the first user equipment may operate within the coverage of the base station and then deviate from the coverage of the base station. The first user equipment may identify that the connection with the base station is lost.

For another example, even when the first user equipment is located within the coverage of the base station, the connection with the base station may be lost due to interference/collision. The first user equipment may identify that the connection with the base station is lost.

In operation 1720, the first user equipment may determine whether wireless LAN communication is possible. When the cellular communication connection is disconnected, the first user equipment may determine whether wireless LAN communication is possible in order to perform communication with another user equipment. For example, the first user equipment may perform scanning for identifying a network existing around the first user. Thereafter, the first user equipment may determine whether wireless LAN communication is possible by exchanging probe request frame and probe response frame with other user equipment (e.g., access point (AP) or second user equipment).

In operation 1730, when wireless LAN communication is possible, the first user equipment may establish a wireless LAN connection and perform wireless LAN communication. For example, after exchanging probe request frame and probe response frame with other user equipment (e.g., access point (AP) or second user equipment), the first user equipment may establish a wireless LAN connection.

In operation 1740, when wireless LAN communication is impossible, the first user equipment may maintain an existing communication state. For example, the first user equipment may attempt to reconnect to the base station. As another example, the first user equipment may attempt to connect with a different base station from an existing connected base station.

Figure 18:
FIG. 18 is a simplified block diagram of user equipment according to various embodiments.
Figure 18:
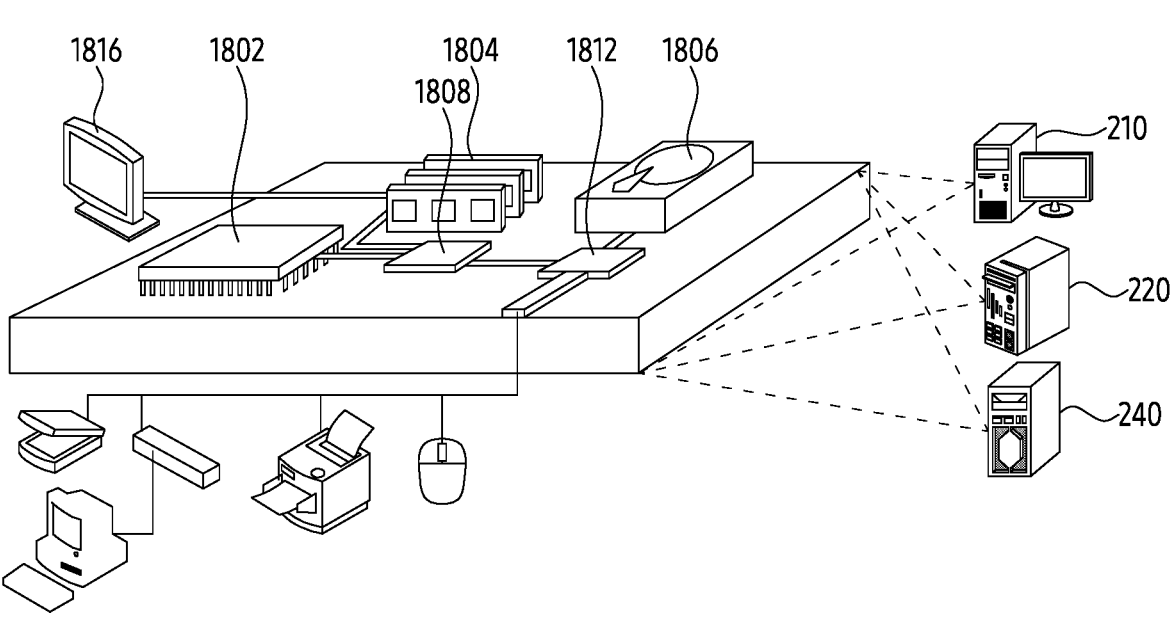

FIG. 18 is a simplified block diagram of electronic devices according to various embodiments.

Referring to FIG. 18, the electronic device 1800 may be an example of the electronic device 210, the electronic device 220, or the electronic device 240. The electronic device 1800 may comprise a processor 1802, a memory 1804, a storage device 1806, high-speed controller 1808 (e.g., northbridge, MCH (Main Controller Hub)) and low-speed controller 1812 (e.g., southbridge, ICH (I/O controller hub)). In the electronic device 1800, each of the processor 1802, the memory 1804, the storage device 1806, the fast controller 1808, and the slow controller 1812 may be interconnected using various buses.

For example, the processor 1802 may process instructions for execution in the electronic device 1800 in order to display graphic information on a graphical user interface (GUI) on an external input/output device such as display 1816 connected to high-speed controller 1808. The instructions may be comprised in the memory 1804 or the storage device 1806. The instructions may cause the electronic device 1800 to perform one or more of the above-described operations when executed by processor 1802. According to embodiments, the processor 1802 may be composed of a plurality of processors including a communication processor and a GPU (graphical processing unit).

For example, the memory 1804 may store information in the electronic device 1800. For example, the memory 1804 may be a volatile memory unit or units. As another example, the memory 1804 may be a nonvolatile memory unit or units. For another example, memory 1804 may be another type of computer-readable medium, such as a magnetic or optical disk.

For example, the storage device 1806 may provide a mass storage space to the electronic device 1800. For example, storage device 1806 may be a computer-readable medium such as a hard disk device, an optical disk device, flash memory, solid state memory devices, or an array of devices in a storage area network (SAN).

For example, the high-speed controller 1808 may manage bandwidth-intensive operations for electronic device 1800, while low-speed controller 1812 may manage low bandwidth-intensive operations for electronic device 1800. For example, the high-speed controller 1808 may be coupled to the memory 1804 and coupled to the display 1816 through a GPU or accelerator, while the low speed controller 1812 may be coupled to the storage device 1806 and coupled to various communication ports (e.g., universal serial bus (USB), Bluetooth, Ethernet, wireless Ethernet) for communication with an external electronic device (e.g., keyboard, transducer, scanner, or network device (e.g., switch or router)).

According to various embodiments, a first user equipment (UE) may comprise an antenna for receiving a first reception signal for wireless LAN communication and a second reception signal for sidelink communication; a radio frequency (RF) front-end for processing the first reception signal and the second reception signal; a first transceiver for the wireless LAN communication; a second transceiver for the sidelink communication; and a processor operably coupled to the first transceiver and the second transceiver, wherein the first reception signal may be provided from a second UE to the RF front-end through the antenna, wherein the second reception signal may be provided from a third UE to the RF front-end through the antenna, wherein the first reception signal provided to the RF front-end may be provided to the first transceiver through a first electrical path, wherein the second reception signal provided to the RF front-end may be provided to the second transceiver through a second electrical path, wherein the first reception signal provided to the first transceiver may be converted into a third reception signal on baseband, wherein the second reception signal provided to the second transceiver may be converted into a fourth reception signal on the baseband, wherein the third reception signal may be provided from the first transceiver to the processor, and wherein the fourth reception signal may be provided from the second transceiver to the processor.

According to an embodiment, the RF front-end may comprise a frequency filter and a signal amplifier.

According to an embodiment, a path through which the first reception signal and the second reception signal are provided may be divided into one of the first electrical path and the second electrical path through the frequency filter.

According to an embodiment, the first reception signal may be amplified by the signal amplifier and provided to the first transceiver.

According to an embodiment, the second reception signal may be amplified by the signal amplifier and provided to the second transceiver.

According to an embodiment, the first reception signal and the second reception signal may be received through the antenna in the unlicensed band.

According to an embodiment, the UE may be further comprising a switch controlled by the processor.

According to an embodiment, the processor may be configured to control, via the switch, the first electrical path and the second electrical path.

According to an embodiment, the processor may be configured to activate, via the switch, one of the first electrical path and the second electrical path based on a subcarrier spacing of the reception signal.

According to an embodiment, the processor may be configured to receive a signal composed of one of the first reception signal and the second reception signal, and activate, via the switch, the first electrical path on a condition that a subcarrier spacing of the received signal is 156.25 kHz.

According to an embodiment, the processor may be configured to activate, via the switch, the second electrical path on a condition that a subcarrier spacing of received signal is one of 15 kHz, 30 kHz, 60 kHz, 120 kHz, and 240 kHz.

According to an embodiment, the UE may further comprise an antenna tuning unit.

According to an embodiment, the antenna tuning unit may be connected between the RF transceiver and the antenna, and wherein the antenna tuning unit may be used to adjust impedance related to the antenna.

According to various embodiments, a first user equipment (UE) may comprise a processor for generating a first transmission signal for wireless LAN communication and a second transmission signal for sidelink communication; a first transceiver for the wireless LAN communication operably coupled to the processor, a second transceiver for the sidelink communication operably coupled to the processor, a radio frequency (RF) front-end for processing a third transmission signal and a fourth transmission signal; and an antenna for transmitting the third transmission signal and the fourth transmission signal, wherein the first transmission signal on the baseband may be converted into the third transmission signal configured in a format for the wireless LAN communication through the first transceiver, wherein the second transmission signal on the baseband may be converted into the fourth transmission signal configured in a format for the sidelink communication through the second transceiver, wherein the third transmission signal may be provided from the first transceiver to the RF front-end through a first electrical path, wherein the fourth transmission signal may be provided from the second transceiver to the RF front-end through a second electrical path, wherein the third transmission signal and the fourth transmission signal may be provided to the antenna through the RF front end, and wherein the third transmission signal and the fourth transmission signal may be transmitted to the second UE through the antenna.

According to an embodiment, the processor may be configured to identify traffic to be transmitted to the second UE, determine whether the sidelink communication with the second UE is connected, based on that the connection of the sidelink communication with the second UE is not established, determine whether the wireless LAN communication with the second UE is connected, and on a condition that the wireless LAN communication with the second UE is connected, transmit the traffic through the wireless LAN communication.

According to an embodiment, the processor may be configured to transmit the traffic by broadcast on a condition that the wireless LAN communication with the second UE is not connected.

According to an embodiment, the processor may be configured to transmit the traffic to a base station connected with the first UE on a condition that the wireless LAN communication with the second UE is not connected.

According to an embodiment, the processor may be configured to identify a value related to communication quality of the sidelink communication while performing the sidelink communication, and on a condition that the value related to communication quality of the sidelink communication is less than or equal to a reference value, perform communication through the wireless LAN.

According to an embodiment, the value related to communication quality of the sidelink communication may be set based on sidelink-reference signal received quality (SL-RSRQ).

According to an embodiment, the RF front-end may comprise a frequency filter and a signal amplifier.

According to an embodiment, a path through which the third transmission signal and the fourth transmission signal may be transmitted is divided into one of the first electrical path and the second electrical path through the frequency filter.

According to an embodiment, the third transmission signal and the fourth transmission signal may be amplified by the signal amplifier and transmitted.

According to an embodiment, the third transmission signal and the fourth transmission signal may be transmitted through the antenna in the unlicensed band.

According to an embodiment, a subcarrier spacing of the third transmission signal may be set to 156.25 kHz, and wherein bandwidth of the third transmission signal may be set to one of 10 MHz and 20 MHz.

According to an embodiment, a subcarrier spacing of the fourth transmission signal may be set to one of 15 kHz, 30 kHz, 60 kHz, 120 kHz, and 240 kHz.

According to an embodiment, the UE may further comprise a switch controlled by the processor.

According to an embodiment, the processor may be configured to control, via the switch, the first electrical path and the second electrical path.

According to an embodiment, the UE may further comprise an antenna tuning unit. According to an embodiment, the antenna tuning unit may be connected between the RF transceiver and the antenna, and may be used to adjust impedance related to the antenna.

The user equipment according to the above-described embodiments may include a vehicle. When the user equipment according to the above-described embodiments is a vehicle, the sidelink communication according to the above-described embodiments may mean V2X communication. Accordingly, a detailed configuration of a vehicle, which is a user equipment for performing the above-described embodiments, may be described in FIGS. 19 to 21.

Figure 19:
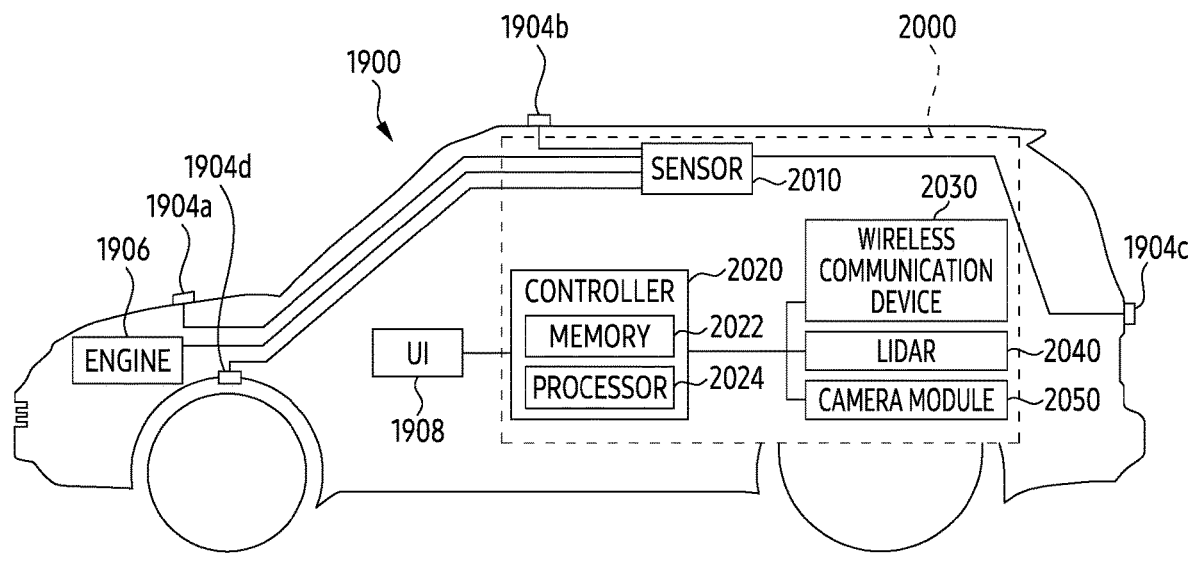
FIG. 19 illustrates an example of a user equipment according to various embodiments.

FIG. 19 illustrates an example of a user equipment according to various embodiments.

Figure 20:
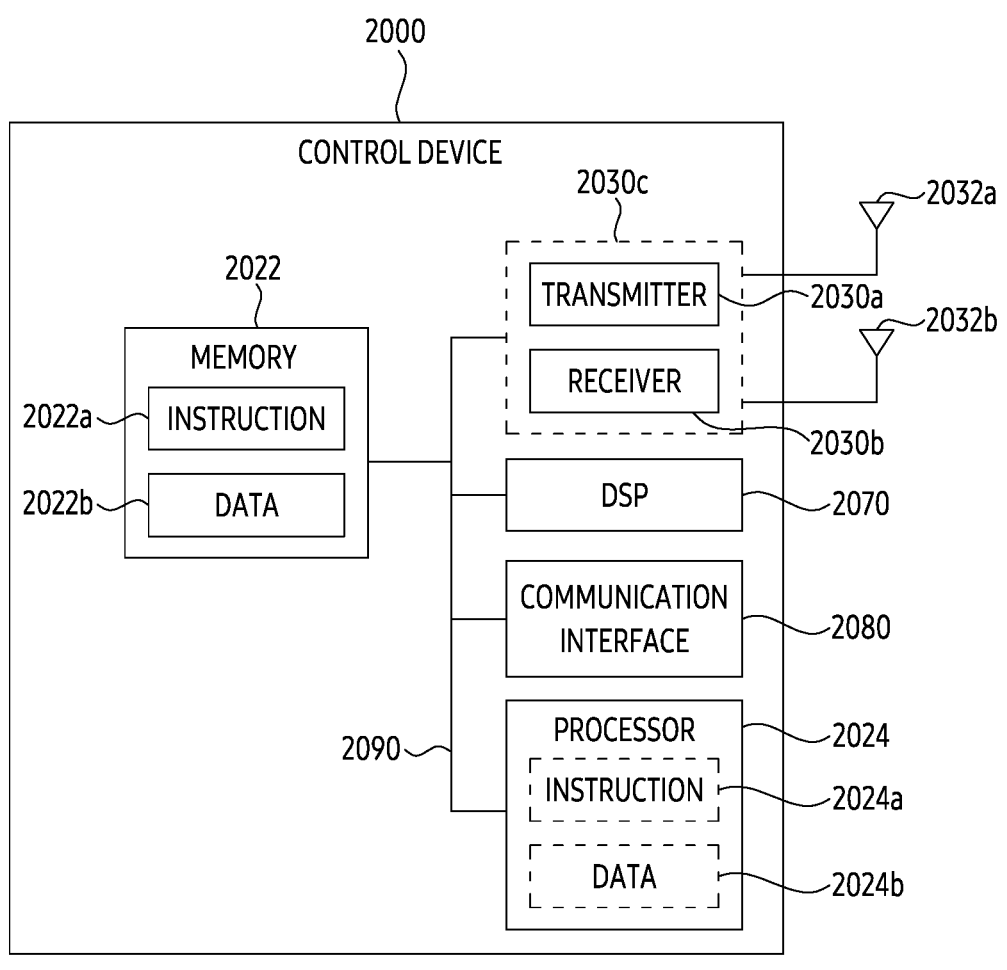
FIG. 20 illustrates an example of a functional configuration of a user equipment according to various embodiments.

FIG. 20 illustrates an example of a functional configuration of a user equipment according to various embodiments.

Figure 21:
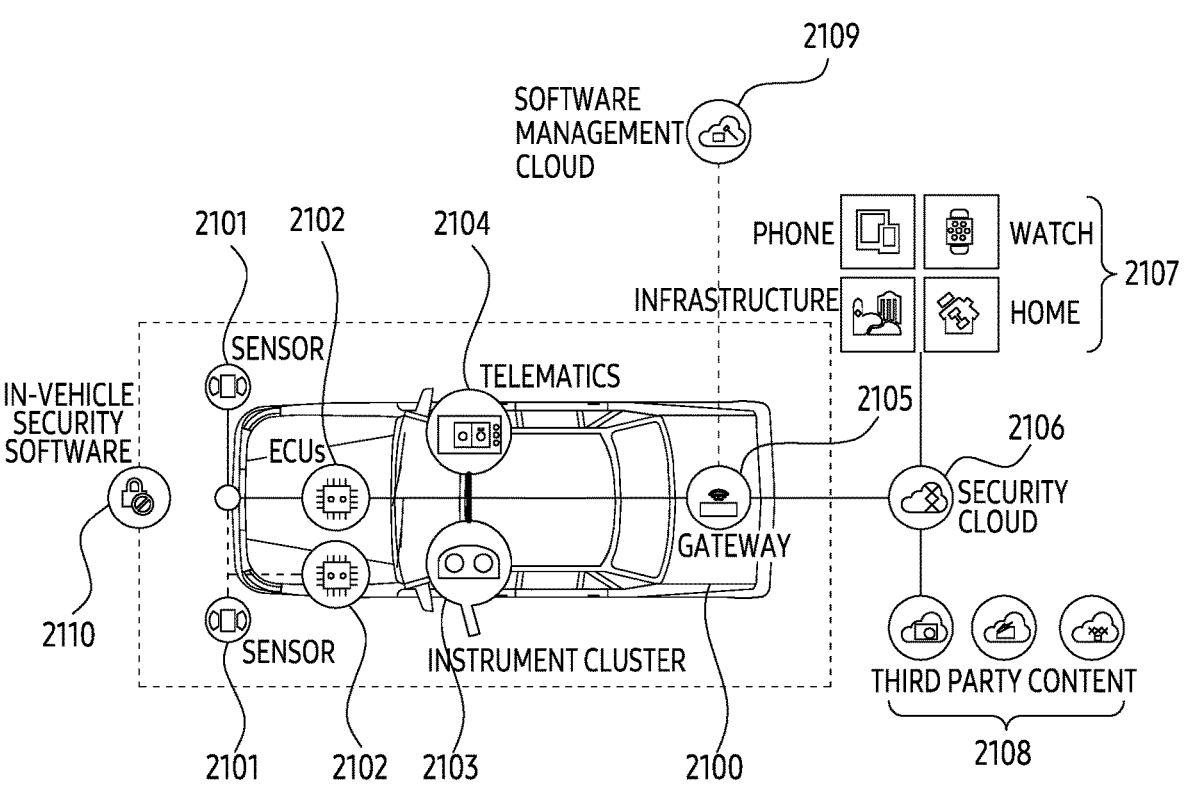
FIG. 21 illustrates an example of a gateway related to a user equipment according to various embodiments.

FIG. 21 illustrates an example of a gateway related to a user equipment according to various embodiments.

Referring to FIGS. 19 to 21, the control device 2000 according to various embodiments may be mounted on the vehicle 1900.

In various embodiments, the control device 2000 may include a controller 2020 including a memory 2022 and a processor 2024, and a sensor 2010.

According to various embodiments, the controller 2020 may be configured by a manufacturer of a vehicle or may be additionally configured to perform a function of autonomous driving after manufacturing. Alternatively, a configuration for continuously performing additional functions may be included through an upgrade of the controller 2020 configured during manufacturing.

The controller 2020 may transmit the control signal to the sensor 2010, the engine 1906, the user interface 1908, the wireless communication device 2030, the LIDAR 2040, and the camera module 2050 included in other components in the vehicle. In addition, although not shown, the controller 2020 may transmit a control signal to an acceleration device, a braking system, a steering device, or a navigation device related to driving of the vehicle.

In various embodiments, the controller 2020 may control the engine 1906, for example, detect the speed limit on the road where the autonomous vehicle 1900 is traveling, control the engine 1906 so that the driving speed does not exceed the speed limit, or control the engine 1906 to accelerate the driving speed of the autonomous vehicle 1900 within a speed limit. In addition, when sensing modules 1904a, 1904b, 1904c, and 1904d detect the environment outside the vehicle and transmit it to the sensor 2010, the controller 2020 may receive it and generate a signal for controlling the engine 1906 or the steering device (not shown) to control driving of the vehicle.

When there is another vehicle or obstruction in front of the vehicle, the controller 2020 may control the engine 1906 or the braking system to decelerate the driving vehicle and in addition to speed, control a trajectory, a driving path, and a steering angle. Alternatively, the controller 2020 may control driving of the vehicle by generating a necessary control signal according to recognition information of other external environments such as a driving lane of the vehicle and a driving signal.

By performing communication with neighboring vehicles or central servers in addition to generating their own control signals and transmitting commands for controlling peripheral devices through the received information, the controller 2020 may also control driving of the vehicle.

In addition, when the position of the camera module 2050 is changed or the angle of view is changed, accurate vehicle or lane recognition may be difficult, to prevent this, the controller 2020 may generate a control signal for controlling the camera module 2050 to perform calibration. In other words, even when the mounting position of the camera module 2050 is changed due to vibration or impact generated by the movement of the autonomous vehicle 1900, the controller 2020 may continuously maintain a normal mounting position, direction, and angle of view of the camera module 2050 by generating a calibration control signal to the camera module 2050. When the initial mounting position, direction, and angle of view information of the camera module 2050 stored in advance and the initial mounting position, direction, and angle of view information of the camera module 2050 measured while driving of the autonomous vehicle 1900 vary above a threshold value, the controller 2020 may generate a control signal to perform calibration of the camera module 2050.

According to various embodiments, the controller 2020 may comprise a memory 2022 and a processor 2024. The processor 2024 may execute the software stored in the memory 2022 according to the control signal of the controller 2020. Specifically, the controller 2020 stores data and instructions for scrambling audio data according to various embodiments in the memory 2022, and the instructions may be executed by processor 2024 to implement one or more methods disclosed herein.

In various embodiments, the memory 2022 may be stored in a recording medium executable by the processor 2024. The memory 2022 may store software and data through an appropriate internal and external device. The memory 2022 may be configured as a device connected to random access memory (RAM), read only memory (ROM), hard disk, and dongle.

The memory 2022 may store at least an operating system (OS), a user application, and executable commands. The memory 2022 may also store application data and array data structures.

The processor 2024 may be a controller, microcontroller, or state machine as a microprocessor or an appropriate electronic processor.

The processor 2024 may be implemented as a combination of computing devices, the computing device may be a digital signal processor, microprocessor, or configured in an appropriate combination thereof.

In addition, according to various embodiments, the control device 2000 may monitor internal and external features of the autonomous vehicle 1900 and detect a state thereof with at least one sensor 2010.

The sensor 2010 may be configured with at least one sensing module 1904 (e.g., sensor 1904a, sensor 1904b, sensor 1904c, and sensor 1904d), the sensing module 1904 may be implemented at a specific location of the autonomous vehicle 1900 according to the sensing purpose. For example, the sensing module 1904 may be located at a lower end, a rear end, a front end, an upper end, or a side end of the autonomous vehicle 1900, and may also be located at an internal component or tire of the vehicle.

Through this, the sensing module 1904 may detect information related to driving, such as engine 1906, tire, steering angle, speed, vehicle weight, and the like, as internal information of the vehicle. In addition, at least one sensing module 1904 may include an acceleration sensor, a gyroscope, an image sensor, a RADAR, an ultrasonic sensor, a LiDAR sensor and the like, and detect movement information of the autonomous vehicle 1900.

The sensing module 1904 may receive specific data on an external environmental state such as state information of a road on which the autonomous vehicle 1900 is located, surrounding vehicle information, weather, and the like, and may detect vehicle parameters accordingly. The detected information may be stored in the memory 2022, temporarily or in the long term, depending on the purpose.

According to various embodiments, the sensor 2010 may integrate and collect information of sensing modules 1904 for collecting information generated inside and outside the autonomous vehicle 1900.

The control device 2000 may further comprise a wireless communication device 2030.

The wireless communication device 2030 is configured to implement wireless communication between autonomous vehicles 1900. For example, the autonomous vehicle 1900 may communicate with a user's mobile phone, another wireless communication device 2030, another vehicle, a central device (traffic control device), a server, and the like. The wireless communication device 2030 may transmit and receive a wireless signal according to a connection wireless protocol. A wireless communication protocols may be Wi-Fi, Bluetooth, Long-Term Evolution (LTE), Code Division Multiple Access (CDMA), Wideband Code Division Multiple Access (WCDMA), Global Systems for Mobile Communications (GSM), and the communication protocol is not limited thereto.

In addition, according to various embodiments, in addition, according to various embodiments, the autonomous vehicle 1900 may implement communication between vehicles through the wireless communication device 2030. In other words, the wireless communication device 2030 may communicate with other vehicles and other vehicles on the road through V2V (vehicle-to-vehicle communication or V2X). The autonomous vehicle 1900 may transmit and receive information such as a driving warning and traffic information through communication between vehicles and may request information or receive requests from other vehicles. For example, the wireless communication device 2030 may perform V2V communication with a dedicated short-range communication (DSRC) device or a cellular-V2V (C-V2V) device. Besides communication between vehicles, V2X (vehicle to everything communication) between the vehicle and other objects (e.g., electronic devices carried by pedestrians) may also be implemented through the wireless communication device 2030.

In addition, the control device 2000 may comprise the LIDAR device 2040. The LIDAR device 2040 may detect an object around the autonomous vehicle 1900 during operation Using data sensed through a LIDAR sensor. The LIDAR device 2040 may transmit the detected information to the controller 2020, and the controller 2020 may operate the autonomous vehicle 1900 according to the detection information. For example, when there is a vehicle ahead moving at low speed in the detection information, the controller 2020 may command the vehicle to slow down through the engine 1906. Alternatively, the vehicle may be ordered to slow down according to the curvature of the curve into which it is entering.

The control device 2000 may further comprise a camera module 2050. The controller 2020 may extract object information from an external image photographed by the camera module 2050 and allow the controller 2020 to process information on the information.

In addition, the control device 2000 may further comprise imaging devices for recognizing an external environment. In addition to the LIDAR 2040, RADAR, GPS devices, driving distance measuring devices (Odometry), and other computer vision devices may be used, and these devices operate selectively or simultaneously as needed to enable more precise detection.

The autonomous vehicle 1900 may further comprise a user interface 1908 for user input to the control device 2000 described above. User interface 1908 may allow the user to input information with appropriate interaction. For example, it may be implemented as a touch screen, a keypad, an operation button, or the like. The user interface 1908 may transmit an input or command to the controller 2020, and the controller 2020 may perform a vehicle control operation in response to the input or command.

In addition, the user interface 1908 may perform communication with the autonomous vehicle 1900 through the wireless communication device 2030 which is a device outside the autonomous vehicle 1900. For example, the user interface 1908 may enable interworking with a mobile phone, tablet, or other computer device.

Furthermore, according to various embodiments, although the autonomous vehicle 1900 is described as including the engine 1906, may also comprise other types of propulsion systems. For example, the vehicle may be operated with electrical energy and may be operated through hydrogen energy, or a hybrid system combined with the same. Accordingly, the controller 2020 may include a propulsion mechanism according to a propulsion system of the autonomous vehicle 1900 and provide a control signal accordingly to the components of each propulsion mechanism.

Hereinafter, a detailed configuration of the control device 2000 for scrambling audio data according to various embodiments will be described in more detail with reference to FIG. 20.

The control device 2000 includes a processor 2024. The processor 2024 may be a general purpose single or multichip microprocessor, a dedicated microprocessor, a microcontroller, a programmable gate array, or the like. The processor may be referred to as a central processing unit (CPU). In addition, according to various embodiments, the processor 2024 may be used as a combination of a plurality of processors.

The control device 2000 also comprises a memory 2022. The memory 2022 may be any electronic component capable of storing electronic information. The memory 2022 may also include a combination of memories 2022 in addition to a single memory.

According to various embodiments, data and instructions 2022*a* for scrambling audio data may be stored in the memory 2022. When the processor 2024 executes the instructions 2022*a*, the instructions 2022*a* and all or part of the data 2022*b* required for executing the instructions may be loaded onto the processor 2024 (e.g., the instructions 2024*a*, the data 2024*b*).

The control device 2000 may include a transmitter 2030*a*, a receiver 2030*b*, or a transceiver 2030*c* for allowing transmission and reception of signals. One or more antennas 2032*a* and 2032*b* may be electrically connected to a transmitter 2030*a*, a receiver 2030*b*, or each transceiver 2030*c*, and may additionally comprise antennas.

The control device 2000 may comprise a digital signal processor DSP 2070. The DSP 2070 may enable the vehicle to quickly process the digital signal.

The control device 2000 may comprise a communication interface 2080. The communication interface 2080 may comprise one or more ports and/or communication modules for connecting other devices to the control device 2000. The communication interface 2080 may allow the user and the control device 2000 to interact.

Various configurations of the control device 2000 may be connected together by one or more buses 2090, the buses 2090 may comprise a power bus, a control signal bus, a state signal bus, a data bus, and the like. Under the control of the processor 2024, the configurations may transmit mutual information and perform a desired function through the bus 2090.

Meanwhile, in various embodiments, the control device 2000 may be related to a gateway for communication with the secure cloud. For example, referring to FIG. 21, the control device 2000 may be related to the gateway 2105 for providing information obtained from at least one of the components 2101 to 2104 of the vehicle 2100 to the secure cloud 2106. For example, the gateway 2105 may be comprised in the control device 2000. For another example, gateway 2105 may be configured as a separate device in vehicle 2100 distinguished from control device 2000. Gateway 2105 connects software management cloud 2109 having different networks, secure cloud 2106 and network in secured vehicle 2100 by in-vehicle security software 2110 to be enable communication.

For example, component 2101 may be a sensor. For example, the sensor may be used to obtain information on at least one of a state of the vehicle 2100 or a state around the vehicle 2100. For example, component 2101 may comprise a sensor 2010.

For example, component 2102 may be electronic control units (ECUs). For example, the ECUs may be used for engine control, transmission control, airbag control, and tire pressure management.

For example, component 2103 may be an instrument cluster. For example, the instrument cluster may refer to a panel positioned in front of a driver's seat among dashboards. For example, the instrument cluster may be configured to show information necessary for driving to a driver (or passenger). For example, the instrument cluster may be used to display at least one of Visual elements for indicating revolution per minute (RPM), the speed of the vehicle 2100, the amount of residual fuel, gear conditions and information obtained through component 2101.

For example, component 2104 may be a telematics device. For example, the telematics device may refer to a device that provides various mobile communication services such as location information and safe driving in a vehicle 2100 by combining wireless communication technology and global positioning system (GPS) technology. For example, the telematics device may be used to connect the driver, the cloud (e.g., secure cloud 2106), and/or the surrounding environment to the vehicle 2100. For example, the telematics device may be configured to support high bandwidth and low latency for technology of 5G NR standard (e.g., V2X technology of 5G NR). For example, the telematics device may be configured to support autonomous driving of the vehicle 2100.

For example, gateway 2105 may be used to connect a network in the vehicle 2100 to a software management cloud 2109, which are out-of-vehicle networks and a secure cloud 2106. For example, the software management cloud 2109 may be used to update or manage at least one software required for driving and managing the vehicle 2100. For example, the software management cloud 2109 may be linked with in-car security software 2110 installed in the vehicle. For example, in-vehicle security software 2110 may be used to provide a security function in the vehicle 2100. For example, the in-vehicle security software 2110 may encrypt data transmitted and received through the in-vehicle network using an encryption key obtained from an external authorized server for encryption of the in-vehicle network. In various embodiments, the encryption key used by in-vehicle security software 2110 may be generated corresponding to vehicle identification information (vehicle license plate, or information uniquely assigned to each user (e.g., user identification information, vehicle identification number).

In various embodiments, gateway 2105 may transmit data encrypted by in-vehicle security software 2110 to software management cloud 2109 and/or secure cloud 2106 based on the encryption key. Software management cloud 2109 and/or secure cloud 2106 may identify that data was received from which vehicle or from which user, by decrypting the data encrypted by the encryption key of the security software 2110 in the vehicle using a decryption key capable of decrypting the data. For example, since the decryption key is a unique key corresponding to the encryption key, the software management cloud 2109 and/or the secure cloud 2106 may identify a sender (e.g., a vehicle or a user) of data based on the decryption key.

For example, gateway 2105 may be configured to support in-vehicle security software 2110 and may be related to control device 2000. For example, gateway 2105 may be related to control device 2000 to support a connection between client device 2107 connected to secure cloud 2106 and control device 2000. For another example, gateway 2105 may be related to control device 2000 to support a connection between third-party cloud 2108 connected to secure cloud 2106 and control device 2000. However, it is not limited thereto.

In various embodiments, the gateway 2105 may be used to connect the vehicle 2100 with the software management cloud 2109 for managing the operating software of the vehicle 2100. For example, the software management cloud 2109 may monitor whether update of the operating software of the vehicle 2100 is required and provide data for updating the operating software of the vehicle 2100 through the gateway 2105 based on monitoring the request for updating the operating software of the vehicle 2100. For another example, the software management cloud 2109 may receive a user request for updating the operating software of the vehicle 2100 from the vehicle 2100 through the gateway

2105 and provide data for updating the operating software of the vehicle 2100 based on the reception. However, it is not limited thereto.

The device described above may be implemented as a hardware component, a software component, and/or a combination of hardware components and software components. For example, the devices and components described in the embodiments may be implemented using one or more general purpose computers or special purpose computers such as processor, controller, ALU (arithmetic logic unit), digital signal processor, microcomputer, FPGA (field programmable gate array), PLU (programmable logic unit), microprocessor or any other device capable of executing and responding to instructions. The processing device may perform an operating system (OS) and one or more software applications performed on the operating system. In addition, the processing device may access, store, manipulate, process, and generate data in response to execution of the software. For convenience of understanding, although it may be described that one processing device is used, a person skilled in the art may see that the processing device may include a plurality of processing elements and/or a plurality of types of processing elements. For example, the processing device may include a plurality of processors or one processor and one controller. In addition, other processing configurations such as parallel processors are possible.

The software may comprise a computer program, code, instruction, or a combination of one or more of these, configure the processing device to operate as desired, or command the processing device independently or collectively. Software and/or data may be embodied in any type of machine, component, physical device, computer storage medium, or device to be interpreted by a processing device or to provide instructions or data to a processing device. The software may be distributed on networked computer systems and stored or executed in a distributed manner. Software and data may be stored in one or more computer-readable recording media.

The method according to the embodiment may be implemented in the form of a program command that may be performed through various computer means and recorded on a computer-readable medium. In this case, the medium may continue to store a computer-executable program, or may temporarily store the program for execution or download. In addition, the medium may be various recording or storage means in which a single or several hardware is combined, and may not be limited to a medium directly connected to a computer system, but may be distributed over a network. Examples of media comprise magnetic media such as hard disks, floppy disks, and magnetic tape, optical recording media such as CD-ROM and DVD, magneto-optical medium, such as a floptical disk, anything configured to store program instructions, including ROM, RAM, flash memory, etc. In addition, examples of other media include app stores that distribute applications, sites that supply or distribute other various software, and recording media or storage media managed by servers.

Although embodiments have been described according to limited embodiments and drawings as above, various modifications and modifications are possible from the above description to those of ordinary skill in the art. For example, appropriate results may be achieved if the described techniques are performed in a different order from the described methods, and/or components such as systems, structures, devices, and circuits are combined or combined in a different form from the described methods.

Thus, other implementations, other embodiments, and those equivalent to the claims also fall within the scope of the claims to be described later.

What is claimed is:

1. A first user equipment (UE) comprising:
an antenna for receiving a first reception signal for wireless LAN communication and a second reception signal for sidelink communication;
a radio frequency (RF) front-end for processing the first reception signal and the second reception signal;
a first transceiver for the wireless LAN communication;
a second transceiver for the sidelink communication;
a switch configured to provide one of a first electrical path and a second electrical path; and
a processor operably coupled to the first transceiver, the second transceiver, and the switch,
wherein the first reception signal which is received from a second UE through the wireless LAN communication, is provided to the RF front-end through the antenna,
wherein the second reception signal which is received from the second UE through the sidelink communication, is provided to the RF front-end through the antenna,
wherein the first reception signal provided to the RF front-end is provided to the first transceiver through the first electrical path,
wherein the second reception signal provided to the RF front-end is provided to the second transceiver through the second electrical path,
wherein the first reception signal provided to the first transceiver is converted into a third reception signal on baseband,
wherein the second reception signal provided to the second transceiver is converted into a fourth reception signal on the baseband,
wherein the third reception signal is provided from the first transceiver to the processor,
wherein the fourth reception signal is provided from the second transceiver to the processor, and
wherein the processor is configured to:
identify whether the sidelink communication with the second UE is established,
based on identifying that the sidelink communication is established:
via the switch, deactivate the first electrical path and activate the second electrical path, and
while the second electrical path is activated, perform the sidelink communication with the second UE,
identify a value related to communication quality of the sidelink communication while performing the sidelink communication, and
on a condition that the value related to communication quality of the sidelink communication is less than or equal to a reference value, via the switch, activate the first electrical path and deactivate the second electrical path and perform communication through the wireless LAN, and
based on identifying that the sidelink communication is not established:
via the switch, activate the first electrical path and deactivate the second electrical path, and
while the first electrical path is activated, perform the wireless LAN communication from the second UE.

2. The first UE according to claim 1, wherein the RF front-end comprises a frequency filter and a signal amplifier, wherein a path through which the first reception signal and the second reception signal are provided is divided into one of the first electrical path and the second electrical path through the frequency filter, wherein the first reception signal is amplified by the signal amplifier and provided to the first transceiver, and wherein the second reception signal is amplified by the signal amplifier and provided to the second transceiver.

3. The first UE according to claim 1, wherein the first reception signal and the second reception signal are received through the antenna in the unlicensed band.

4. The first UE according to claim 1, wherein the processor is configured to:

receive a signal composed of one of the first reception signal and the second reception signal, and activate, via the switch, one of the first electrical path and the second electrical path based on a subcarrier spacing of the reception signal.

5. The first UE according to claim 4, wherein the processor is configured to activate, via the switch, the first electrical path on a condition that a subcarrier spacing of the received signal is 156.25 kHz.

6. The first UE according to claim 4, wherein the processor is configured to activate, via the switch, the second electrical path on a condition that a subcarrier spacing of received signal is one of 15 kHz, 30 kHz, 60 kHz, 120 kHz, and 240 kHz.

7. The first UE according to claim 1, further comprising an antenna tuning unit, wherein the antenna tuning unit is connected between the RF transceiver and the antenna, and wherein the antenna tuning unit is used to adjust impedance related to the antenna.

8. A first user equipment (UE) comprising:

a processor for generating a first transmission signal for wireless LAN communication and a second transmission signal for sidelink communication;

a first transceiver for the wireless LAN communication operably coupled to the processor;

a second transceiver for the sidelink communication operably coupled to the processor;

a radio frequency (RF) front-end for processing a third transmission signal and a fourth transmission signal; and an antenna for transmitting the third transmission signal and the fourth transmission signal, wherein the first transmission signal on the baseband is converted into the third transmission signal configured in a format for the wireless LAN communication through the first transceiver, wherein the second transmission signal on the baseband is converted into the fourth transmission signal configured in a format for the sidelink communication through the second transceiver, wherein the third transmission signal is provided from the first transceiver to the RF front-end through a first electrical path, wherein the fourth transmission signal is provided from the second transceiver to the RF front-end through a second electrical path, wherein the third transmission signal and the fourth transmission signal are provided to the antenna through the RF front end, wherein the third transmission signal and the fourth transmission signal are transmitted to the second UE through the antenna, and wherein the processor is configured to:

identify traffic to be transmitted to the second UE, determine whether the sidelink communication with the second UE is established, based on that the connection of the sidelink communication with the second UE is not established:

determine whether the wireless LAN communication with the second UE is established, and on a condition that the wireless LAN communication with the second UE is established, transmit the traffic through the wireless LAN communication, based on that the connection of the sidelink communication with the second UE is established:

identify a value related to communication quality of the sidelink communication while performing the sidelink communication, and on a condition that the value related to communication quality of the sidelink communication is less than or equal to a reference value, perform communication through the wireless LAN.

9. The first UE according to claim 8, wherein the processor is configured to transmit the traffic by broadcast on a condition that the wireless LAN communication with the second UE is not established.

10. The first UE according to claim 8, wherein the processor is configured to transmit the traffic to a base station established with the first UE on a condition that the wireless LAN communication with the second UE is not established.

11. The first UE according to claim 8, wherein the value related to communication quality of the sidelink communication is set based on sidelink-reference signal received quality (SL-RSRQ).

12. The first UE according to claim 8, wherein the RF front-end comprises a frequency filter and a signal amplifier, wherein a path through which the third transmission signal and the fourth transmission signal are transmitted is divided into one of the first electrical path and the second electrical path through the frequency filter, and wherein the third transmission signal and the fourth transmission signal are amplified by the signal amplifier and transmitted.

13. The first UE according to claim 8, wherein the third transmission signal and the fourth transmission signal are transmitted through the antenna in unlicensed band.

14. The first UE according to claim 8, wherein a subcarrier spacing of the third transmission signal is set to 156.25 kHz, and wherein bandwidth of the third transmission signal is set to one of 10 MHz and 20 MHz.

15. The first UE according to claim 8, wherein a subcarrier spacing of the fourth transmission signal is set to one of 15 kHz, 30 kHz, 60 kHz, 120 kHz, and 240 kHz.

16. The first UE according to claim 8, further comprising a switch controlled by the processor, wherein the processor is configured to control, via the switch, the first electrical path and the second electrical path.

17. The first UE according to claim 8, further comprising an antenna tuning unit, wherein the antenna tuning unit is connected between the RF transceiver and the antenna, and wherein the antenna tuning unit is used to adjust impedance related to the antenna.

\* \* \* \* \*